(12) United States Patent
Togashi

(10) Patent No.: US 8,098,477 B2
(45) Date of Patent: Jan. 17, 2012

(54) FEEDTHROUGH MULTILAYER CAPACITOR WITH CAPACITANCE COMPONENTS CONNECTED IN PARALLEL

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 393 days.

(21) Appl. No.: 12/169,384

(22) Filed: Jul. 8, 2008

(65) Prior Publication Data

US 2009/0015982 A1 Jan. 15, 2009

(30) Foreign Application Priority Data

Jul. 9, 2007 (JP) .............................. P2007-179964
Oct. 29, 2007 (JP) .............................. P2007-280871

(51) Int. Cl.
*H01G 4/005* (2006.01)
*H01G 4/35* (2006.01)
(52) U.S. Cl. ....................................... 361/303; 361/302
(58) Field of Classification Search .................. 361/303, 361/306.3, 306.2, 306.1, 308.1, 321.1, 302
See application file for complete search history.

(56) References Cited

U.S. PATENT DOCUMENTS

| | | | |
|---|---|---|---|
| 7,092,236 B2 * | 8/2006 | Lee et al. ....................... | 361/311 |
| 7,411,775 B2 | 8/2008 | Togashi | |
| 7,420,796 B2 | 9/2008 | Ota | |
| 7,460,354 B2 | 12/2008 | Shimizu et al. | |
| 7,599,166 B2 * | 10/2009 | Lee et al. ..................... | 361/306.3 |
| 2006/0018081 A1 * | 1/2006 | Hwa Lee et al. ........... | 361/321.2 |
| 2007/0109717 A1 | 5/2007 | Lee et al. | |
| 2007/0247783 A1 * | 10/2007 | Shimizu et al. ............... | 361/303 |

FOREIGN PATENT DOCUMENTS

| | | |
|---|---|---|
| CN | 1967750 A | 5/2007 |
| CN | 101055802 A | 10/2007 |
| CN | 1941235 A | 4/2008 |
| CN | 101178978 A | 5/2008 |
| JP | 01-206615 | 8/1989 |
| JP | A-11-97291 | 4/1999 |
| JP | A-2007-95817 | 4/2007 |

* cited by examiner

*Primary Examiner* — Eric Thomas
*Assistant Examiner* — David M Sinclair
(74) *Attorney, Agent, or Firm* — Oliff & Berridge, PLC

(57) ABSTRACT

A first signal internal electrode is connected to a first signal terminal electrode and a signal connection conductor. A second signal internal electrode is connected to a second signal terminal electrode and the signal connection conductor. A first ground internal electrode is connected to a first ground terminal electrode and a ground connection conductor. A second ground internal electrode is connected to a second ground terminal electrode and the ground connection conductor. The first signal internal electrode and the first ground internal electrode have their respective regions opposed to each other. The second signal internal electrode and the second ground internal electrode have their respective regions opposed to each other. The first signal internal electrode and the second ground internal electrode are not opposed to each other. The second signal internal electrode and the first ground internal electrode are not opposed to each other.

7 Claims, 19 Drawing Sheets

(a)

(b)

(a)

(b)

(a)

(b)

FEEDTHROUGH MULTILAYER CAPACITOR WITH CAPACITANCE COMPONENTS CONNECTED IN PARALLEL

BACKGROUND OF THE INVENTION

1. Field of the Invention

The present invention relates to a feedthrough multilayer capacitor.

2. Related Background Art

A known feedthrough multilayer capacitor is one having a capacitor element body in which dielectric layers and signal and ground internal electrodes are alternately laminated, and signal and ground terminal electrodes formed on the capacitor element body (e.g., cf. Japanese Patent Application Laid-open No. 01-206615).

SUMMARY OF THE INVENTION

An object of the present invention is to provide a feedthrough multilayer capacitor permitting implementation of a circuit in which a plurality of capacitance components are connected in parallel, as a single element.

It is common practice to load a plurality of feedthrough multilayer capacitors on an electronic device. For this reason, a mount space is expended in the electronic device by the number of loaded capacitors. Then the inventors conducted extensive and intensive research on a feedthrough multilayer capacitor permitting implementation of a parallel circuit of capacitance components, as a single element, and accomplished the present invention.

Based on the research result, a feedthrough multilayer capacitor according to the present invention is a feedthrough multilayer capacitor comprising: a capacitor element body with a dielectric property; first and second signal internal electrodes and first and second ground internal electrodes arranged in the capacitor element body; and first and second signal terminal electrodes, first and second ground terminal electrodes, a signal connection conductor, and a ground connection conductor arranged on an exterior of the capacitor element body; wherein the first signal internal electrode is connected to the first signal terminal electrode and the signal connection conductor; wherein the second signal internal electrode is connected to the second signal terminal electrode and the signal connection conductor; wherein the first ground internal electrode is connected to the first ground terminal electrode and the ground connection conductor; wherein the second ground internal electrode is connected to the second ground terminal electrode and the ground connection conductor; wherein the first signal internal electrode and the first ground internal electrode have respective regions opposed to each other so as to sandwich at least a portion of the capacitor element body; wherein the second signal internal electrode and the second ground internal electrode have respective regions opposed to each other so as to sandwich at least a portion of the capacitor element body; wherein the first signal internal electrode and the second ground internal electrode are not opposed to each other; and wherein the second signal internal electrode and the first ground internal electrode are not opposed to each other.

In the feedthrough multilayer capacitor according to the present invention, the first signal internal electrode and the first ground internal electrode have the mutually opposed regions and the second signal internal electrode and the second ground internal electrode have the mutually opposed regions. The first signal internal electrode and the second ground internal electrode are not opposed to each other, and the second signal internal electrode and the first ground internal electrode are not opposed to each other. For these reasons, the above-described feedthrough multilayer capacitor realizes a circuit in which a capacitance component made by the mutually opposed regions of the first signal internal electrode and the first ground internal electrode and a capacitance component made by the mutually opposed regions of the second signal internal electrode and the second ground internal electrode are connected in parallel.

Preferably, the first signal internal electrode and the second ground internal electrode are located in an identical layer, and the second signal internal electrode and the first ground internal electrode are located in an identical layer. This configuration reduces the number of layers of internal electrodes and thus permits the feedthrough multilayer capacitor to be constructed in a lower profile.

Preferably, the first and second signal internal electrodes and the first and second ground internal electrodes are of a meander shape. In this case, the feedthrough multilayer capacitor can have large impedance.

Preferably, an area of the opposed regions of the first signal internal electrode and the first ground internal electrode is different from an area of the opposed regions of the second signal internal electrode and the second ground internal electrode. In this case, the sizes of the two capacitance components are different from each other. For this reason, the feedthrough multilayer capacitor has low impedance over a wide frequency band.

Preferably, the capacitor element body has first and second principal faces of a rectangular shape facing each other, first and second end faces extending in a transverse direction of the first and second principal faces so as to connect the first an second principal faces, and first and second side faces extending in a longitudinal direction of the first and second principal faces so as to connect the first and second principal faces; the first and second signal terminal electrodes and the ground connection conductor are disposed on the first side face; the first and second ground terminal electrodes and the signal connection conductor are disposed on the second side face. In this case, the signal connection conductor is located apart from the ground connection conductor whereby the two capacitance components are formed as more suitably separated from each other.

Preferably, the first signal internal electrode has a main electrode portion including the region opposed to the first ground internal electrode, and lead portions extending from the main electrode portion and connected to the first signal terminal electrode and to the signal connection conductor, respectively; the second signal internal electrode has a main electrode portion including the region opposed to the second ground internal electrode, and lead portions extending from the main electrode portion and connected to the second signal terminal electrode and to the signal connection conductor, respectively; the first ground internal electrode has a main electrode portion including the region opposed to the first signal internal electrode, and lead portions extending from the main electrode portion and connected to the first ground terminal electrode and to the ground connection conductor, respectively; the second ground internal electrode has a main electrode portion including the region opposed to the second signal internal electrode, and lead portions extending from the main electrode portion and connected to the second ground terminal electrode and to the ground connection conductor, respectively.

Another feedthrough multilayer capacitor according to the present invention is a feedthrough multilayer capacitor comprising: a capacitor element body with a dielectric property; a plurality of internal electrode groups each of which comprises a signal internal electrode and a ground internal electrode arranged in the capacitor element body so as to have respective regions opposed to sandwich at least a portion of the capacitor element body; first and second signal terminal electrodes and first and second ground terminal electrodes arranged on an exterior of the capacitor element body; and at least one signal connection conductor and at least one ground connection conductor arranged on the exterior of the capacitor element body; wherein the signal internal electrodes in the respective internal electrode groups are electrically connected to each other through the at least one signal connection conductor; wherein the ground internal electrodes in the respective internal electrode groups are electrically connected to each other through the at least one ground connection conductor; wherein one signal internal electrode among the signal internal electrodes in the respective internal electrode groups is connected to the first signal terminal electrode, and any one signal internal electrode other than the one signal internal electrode among the signal internal electrodes in the respective internal electrode groups is connected to the second signal terminal electrode; wherein one ground internal electrode among the ground internal electrodes in the respective internal electrode groups is connected to the first ground terminal electrode, and any one ground internal electrode other than the one ground internal electrode among the ground internal electrodes in the respective internal electrode groups is connected to the second ground terminal electrode; and wherein the signal internal electrode and the ground internal electrode in respective different internal electrode groups among the plurality of internal electrode groups are not opposed to each other.

In the feedthrough multilayer capacitor according to the present invention, the signal internal electrode and the ground internal electrode have their respective regions opposed to each other in each internal electrode group. The signal internal electrode and the ground internal electrode in different internal electrode groups are not opposed to each other. For these reasons, in the foregoing feedthrough multilayer capacitor there are capacitance components formed in the respective internal electrode groups and these capacitance components thus formed are connected in parallel. Therefore, the present invention realizes a circuit in which a plurality of capacitance components are connected in parallel.

The present invention successfully provides the feedthrough multilayer capacitor permitting implementation of a circuit in which a plurality of capacitance components are connected in parallel, as a single element.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The preferred embodiments of the present invention will be described below in detail with reference to the accompanying drawings. In the description the same elements or elements with the same functionality will be denoted by the same reference symbols, without redundant description.

First Embodiment

Figure 1:
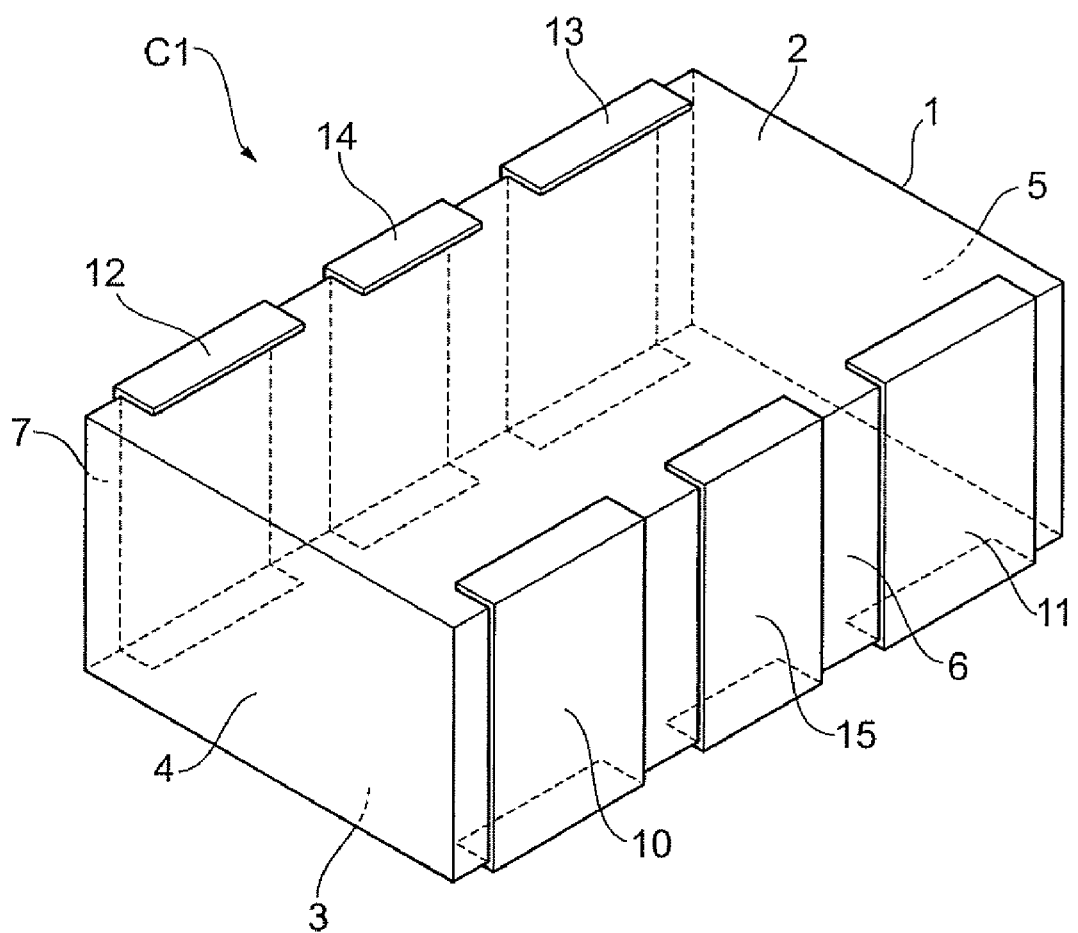
FIG. 1 is a perspective view of a feedthrough multilayer capacitor according to the first embodiment.
Figure 2:
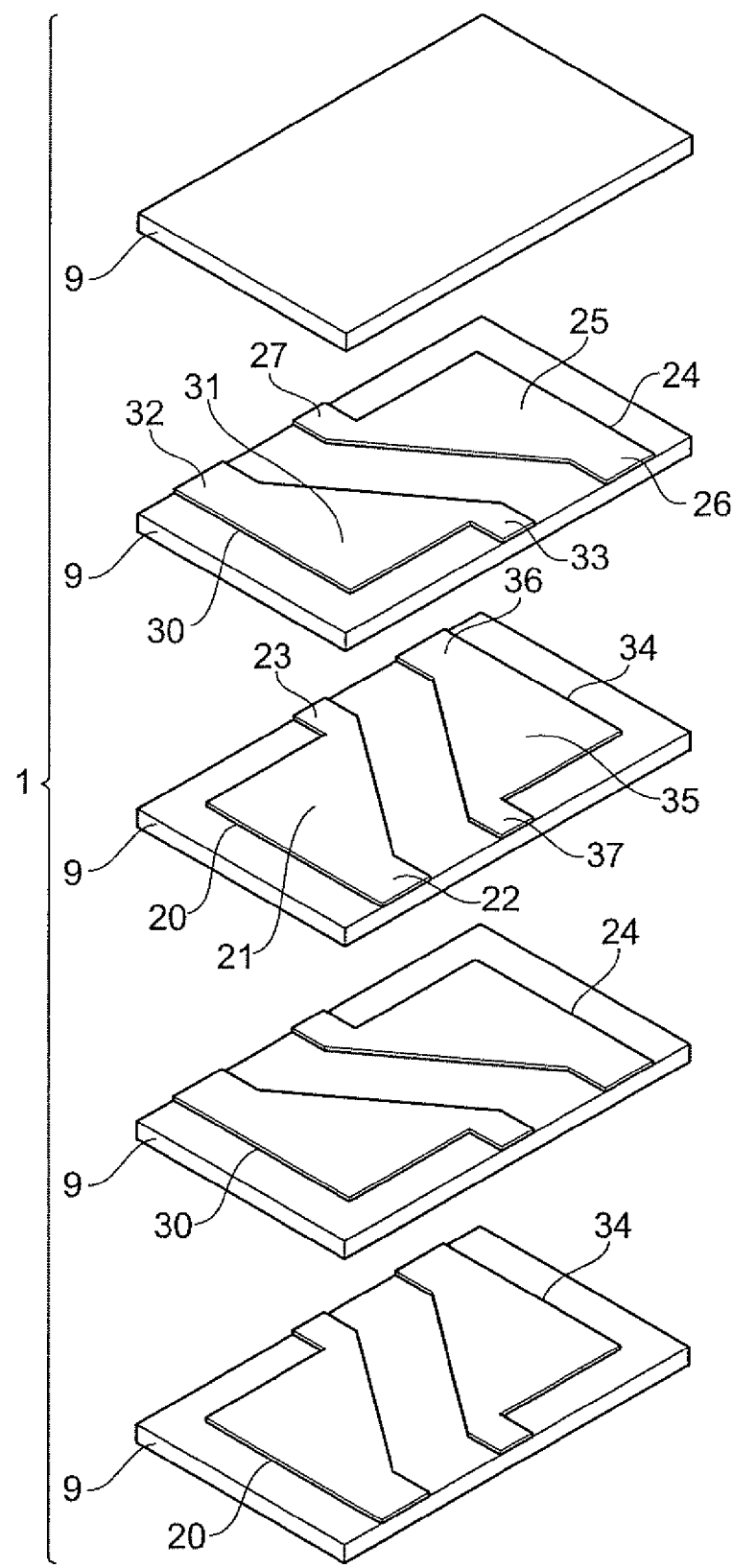
FIG. 2 is an exploded perspective view of a capacitor element body in the feedthrough multilayer capacitor of the first embodiment.
Figure 3:
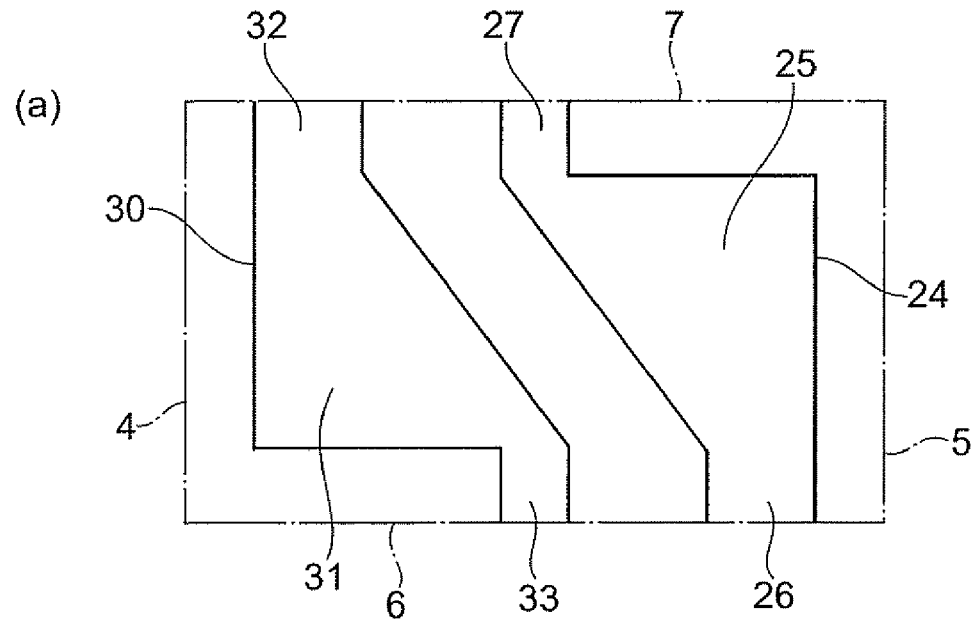
FIG. 3 is a drawing showing configurations of internal electrodes.
Figure 3:
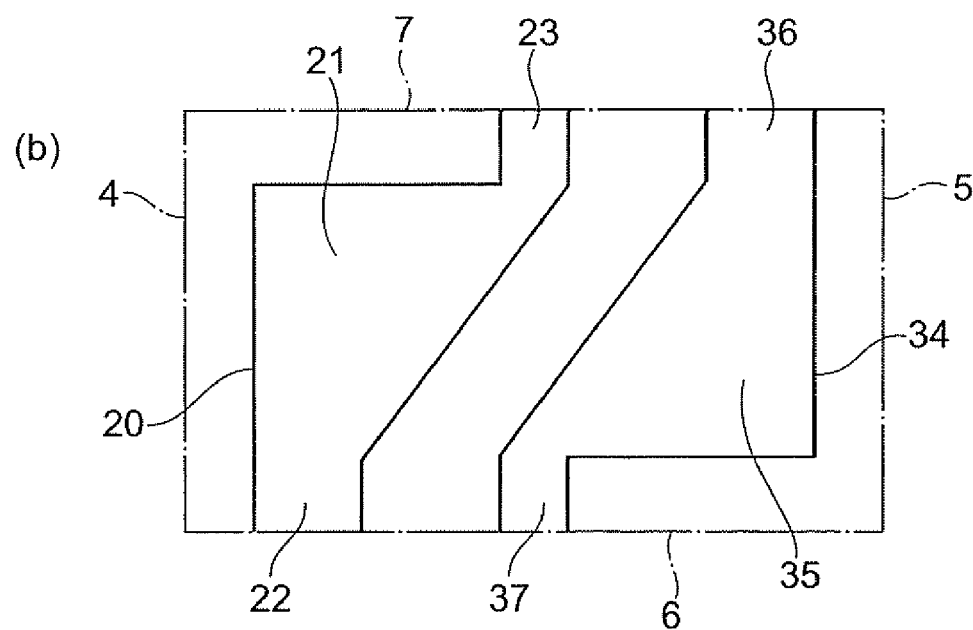
Figure 4:
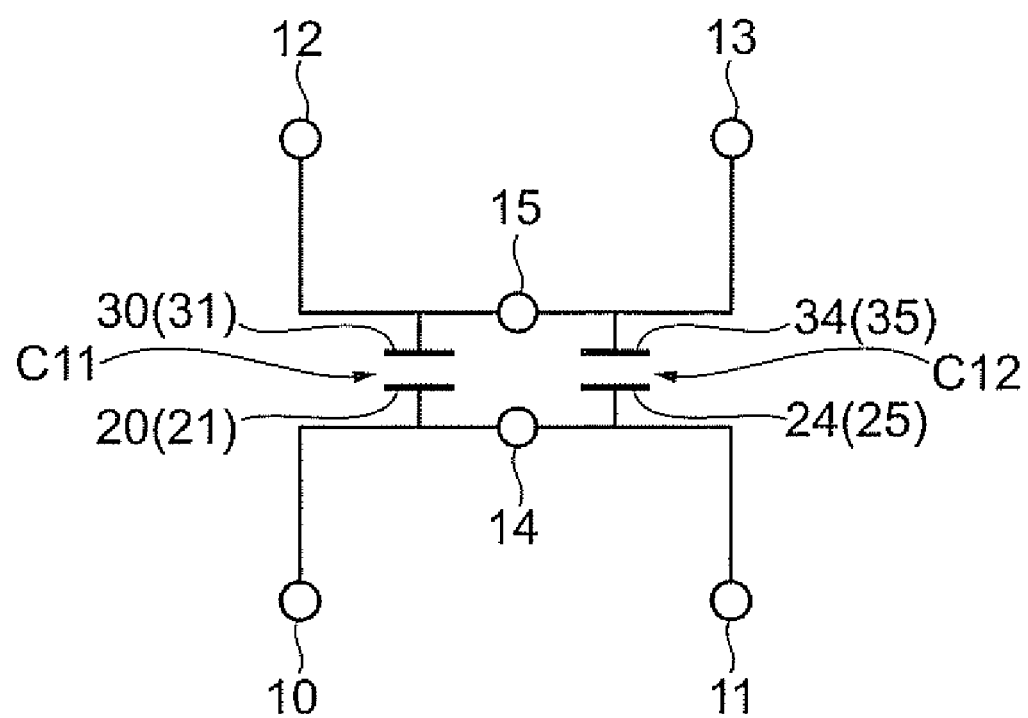
FIG. 4 is an equivalent circuit diagram of the feedthrough multilayer capacitor of the first embodiment.

A configuration of the feedthrough multilayer capacitor C1 according to the first embodiment will be described with reference to FIGS. 1 to 3. FIG. 1 is a perspective view of the feedthrough multilayer capacitor according to the first embodiment. FIG. 2 is an exploded perspective view of the capacitor element body in the feedthrough multilayer capacitor according to the first embodiment. FIG. 3 is a drawing showing configurations of internal electrodes. FIG. 4 is an equivalent circuit diagram of the feedthrough multilayer capacitor according to the first embodiment.

The feedthrough multilayer capacitor C1, as shown in FIG. 1, is provided with a capacitor element body 1, a first signal terminal electrode 10, a second signal terminal electrode 11, a first ground terminal electrode 12, a second ground terminal electrode 13, a signal connection conductor 14, and a ground connection conductor 15.

The capacitor element body 1 is of a nearly rectangular parallelepiped shape and includes first and second principal faces 2, 3 of a rectangular shape facing each other, first and second end faces 4, 5 facing each other, and first and second side faces 6, 7. The first and second end faces 4, 5 extend in the transverse direction of the first and second principal faces 2, 3 so as to connect the first and second principal faces 2, 3. The first and second side faces 6, 7 extend in the longitudinal direction of the first and second principal faces 2, 3 so as to connect the first and second principal faces 2, 3. In the first embodiment, the second principal face 3 is a mounted surface to be opposed to another component (e.g., a circuit board, an electronic component, or the like).

The capacitor element body 1, as shown in FIG. 2, has a plurality of insulator layers 9. The capacitor element body 1 is composed of a laminate in which the insulator layers 9 are laminated in the opposed direction of the first and second principal faces 2, 3, and has the dielectric property. Each insulator layer 9 is composed, for example, of a sintered body of a ceramic green sheet containing a dielectric ceramic (a dielectric ceramic such as a $BaTiO_3$ type ceramic, a $Ba(Ti, Zr)O_3$ type ceramic, or a $(Ba, Ca)TiO_3$ type ceramic). The insulator layers 9 are integrally formed in the practical feedthrough multilayer capacitor C1 so that no border can be visually recognized between them.

The first and second signal terminal electrodes 10, 11 and the ground connection conductor 15 are disposed on the first side face 6 of the capacitor element body 1. Each of the first and second signal terminal electrodes 10, 11 and the ground connection conductor 15 is formed so as to cover a portion of the first side face 6 along the opposed direction of the first and second principal faces 2, 3 and extend up to a certain region of the first and second principal faces 2, 3. The first and second signal terminal electrodes 10, 11 and the ground connection conductor 15 are electrically isolated from each other on the surface of the capacitor element body 1.

The first and second ground terminal electrodes 12, 13 and the signal connection conductor 14 are disposed on the second side face 7 of the capacitor element body 1. Each of the first and second ground terminal electrodes 12, 13 and the signal connection conductor 14 is formed so as to cover a portion of the second side face 7 along the opposed direction of the first and second principal faces 2, 3 and extend up to a certain region of the first and second principal faces 2, 3. The first and second ground terminal electrodes 12, 13 and the signal connection conductor 14 are electrically isolated from each other on the surface of the capacitor element body 1.

The first and second signal terminal electrodes 10, 11 and the ground connection conductor 15 are arranged in the order of the first signal terminal electrode 10, the ground connection conductor 15, and the second signal terminal electrode 11 in the direction from the first end face 4 to the second end face 5 on the first side face 6 of the capacitor element body 1. The first and second ground terminal electrodes 12, 13 and the signal connection conductor 14 are arranged in the order of the first ground terminal electrode 12, the signal connection conductor 14, and the second ground terminal electrode 13 in the direction from the first end face 4 to the second end face 5 on the second side face 7 of the capacitor element body 1. The first signal terminal electrode 10 and the first ground terminal electrode 12 are opposed to each other in the opposed direction of the first and second side faces 6, 7. The signal connection conductor 14 and the ground connection conductor 15 are opposed to each other in the opposed direction of the first and second side faces 6, 7. The second signal terminal electrode 1 and the second ground terminal electrode 13 are opposed to each other in the opposed direction of the first and second side faces 6, 7.

Each terminal electrode 10-13 and each connection conductor 14, 15 are made, for example, by applying an electroconductive paste containing an electroconductive metal powder and glass frit, onto the exterior of the capacitor element body 1 and baking it. A plated layer is sometimes formed on the terminal electrodes and the connection conductors after baked, according to need.

The feedthrough multilayer capacitor C1, as shown in FIG. 2, is provided with first signal internal electrodes 20, second signal internal electrodes 24, first ground internal electrodes 30, and second ground internal electrodes 34. The first and second signal internal electrodes 20, 24 and the first and second ground internal electrodes 30, 34 are arranged in the capacitor element body 1. The first and second signal internal electrodes 20, 24 and the first and second ground internal electrodes 30, 34 are made of an electrically conducive material (e.g., a base metal Ni, or the like) usually used as internal electrodes in a multilayer electric element. Each of the first and second signal internal electrodes 20, 24 and the first and second ground internal electrodes 30, 34 is constructed as a sintered body of an electroconductive paste containing the aforementioned electrically conductive material.

Each first signal internal electrode 20, as also shown in part (b) in FIG. 3, has a main electrode portion 21 and two lead portions 22, 23. The main electrode portion 21 and the two lead portions 22, 23 are integrally formed. The lead portion 22 extends from the edge of the main electrode portion 21 on the first side face 6 side so that an end thereof is exposed in the first side face 6. The lead portion 23 extends from the edge of the main electrode portion 21 on the second side face 7 side so that an end thereof is exposed in the second side face 7.

The first signal terminal electrode 10 is formed so as to cover all the exposed portion of the lead portion 22 in the first side face 6. The lead portion 22 is physically and electrically connected to the first signal terminal electrode 10. The signal connection conductor 14 is formed so as to cover all the exposed portion of the lead portion 23 in the second side face 7. The lead portion 23 is physically and electrically connected to the signal connection conductor 14. This makes the first signal internal electrode 20 connected to the first signal terminal electrode 10 and the signal connection conductor 14.

Each second signal internal electrode 24, as also shown in part (a) in FIG. 3, has a main electrode portion 25 and two lead portions 26, 27. The main electrode portion 25 and the two lead portions 26, 27 are integrally formed. The lead portion 26 extends from the edge of the main electrode portion 25 on the first side face 6 side so that an end thereof is exposed in the first side face 6. The lead portion 27 extends from the edge of the main electrode portion 25 on the second side face 7 side so that an end thereof is exposed in the second side face 7.

The second signal terminal electrode 11 is formed so as to cover all the exposed portion of the lead portion 26 in the first side face 6. The lead portion 26 is physically and electrically connected to the second signal terminal electrode 11. The signal connection conductor 14 is formed so as to also cover all the exposed portion of the lead portion 27 in the second side face 7. The lead portion 27 is physically and electrically connected to the signal connection conductor 14. This makes the second signal internal electrode 24 connected to the second signal terminal electrode 11 and the signal connection conductor 14. The first signal internal electrode 20 and the second signal internal electrode 24 are electrically connected through the signal connection conductor 14.

Each first ground internal electrode 30, as also shown in part (a) in FIG. 3, has a main electrode portion 31 and two lead portions 32, 33. The main electrode portion 31 and the two lead portions 32, 33 are integrally formed. The lead portion 32 extends from the edge of the main electrode portion 31 on the second side face 7 side so that an end thereof is exposed in the second side face 7. The lead portion 33 extends from the edge of the main electrode portion 31 on the first side face 6 side so that an end thereof is exposed in the first side face 6.

The first ground terminal electrode 12 is formed so as to cover all the exposed portion of the lead portion 32 in the second side face 7. The lead portion 32 is physically and electrically connected to the first ground terminal electrode 12. The ground connection conductor 15 is formed so as to cover all the exposed portion of the lead portion 33 in the first side face 6. The lead portion 33 is physically and electrically connected to the ground connection conductor 15. This makes the first ground internal electrode 30 connected to the first ground terminal electrode 12 and the ground connection conductor 15.

Each second ground internal electrode 34, as also shown in part (b) in FIG. 3, has a main electrode portion 35 and two lead portions 36, 37. The main electrode portion 35 and the two lead portions 36, 37 are integrally formed. The lead portion 36 extends from the edge of the main electrode portion 35 on the second side face 7 side so that an end thereof is exposed in the second side face 7. The lead portion 37 extends from the edge of the main electrode portion 35 on the first side face 6 side so that an end thereof is exposed in the first side face 6.

The second ground terminal electrode 13 is formed so as to cover all the exposed portion of the lead portion 36 in the second side face 7. The lead portion 36 is physically and electrically connected to the second ground terminal electrode 13. The ground connection conductor 15 is formed so as to also cover all the exposed portion of the lead portion 37 in the first side face 6. The lead portion 37 is physically and electrically connected to the ground connection conductor 15. This makes the second ground internal electrode 34 connected to the second ground terminal electrode 13 and the ground connection conductor 15. The first ground internal electrode 30 and the second ground internal electrode 34 are electrically connected through the ground connection conductor 15.

The main electrode portion 21 of the first signal internal electrode 20 and the main electrode portion 31 of the first ground internal electrode 30 include their respective regions opposed to each other in the laminating direction of the insulator layers 9 so as to sandwich at least one insulator layer 9 being a portion of the capacitor element body 1. Namely, the first signal internal electrode 20 and the first ground internal electrode 30 have their respective regions opposed to each other in the laminating direction of the insulator layers 9 so as to sandwich a portion of the capacitor element body 1. Therefore, an overlap of the insulator layer 9 with the main electrode portion 21 of the first signal internal electrode 20 and the main electrode portion 31 of the first ground internal electrode 30 is a region that substantially produces a capacitance component.

The main electrode portion 25 of the second signal internal electrode 24 and the main electrode portion 35 of the second ground internal electrode 34 include their respective regions opposed to each other so as to sandwich at least one insulator layer 9 being a portion of the capacitor element body 1. Namely, the second signal internal electrode 24 and the second ground internal electrode 34 have their respective regions opposed to each other so as to sandwich a portion of the capacitor element body 1. Therefore, an overlap of the insulator layer 9 with the main electrode portion 25 of the second signal internal electrode 24 and the main electrode portion 35 of the second ground internal electrode 34 is a region that substantially produces one capacitance component.

The first signal internal electrode 20 and the second ground internal electrode 34 are not opposed in the laminating direction of the insulator layers 9. This results in producing no substantial capacitance component between the first signal internal electrode 20 and the second ground internal electrode 34. In the first embodiment the first signal internal electrode 20 and the second ground internal electrode 34 are located in the same layer and with a predetermined gap in the opposed direction of the first and second end faces 4, 5. The first signal internal electrode 20 and the second signal internal electrode 24 are located in respective different layers.

The second signal internal electrode 24 and the first ground internal electrode 30 are not opposed in the laminating direction of the insulator layers 9. This results in producing no substantial capacitance component between the second signal internal electrode 24 and the first ground internal electrode 30. In the first embodiment the second signal internal electrode 24 and the first ground internal electrode 30 are located in the same layer and with a predetermined gap in the opposed direction of the first and second end faces 4, 5. The first ground internal electrode 30 and the second ground internal electrode 34 are located in respective different layers.

In the first embodiment, the feedthrough multilayer capacitor C1 is provided with an internal electrode group including the first signal internal electrodes 20 and the first ground internal electrodes 30, and another internal electrode group including the second signal internal electrodes 24 and the second ground internal electrodes 34. The first signal internal electrodes 20 and the second signal internal electrodes 24 are electrically connected to each other through the signal connection conductor 14. The first ground internal electrodes 30 and the second ground internal electrodes 34 are electrically connected to each other through the ground connection conductor 15. The foregoing two internal electrode groups are juxtaposed in the opposed direction of the first and second end faces 4, 5 in the capacitor element body 1.

Figure 5:
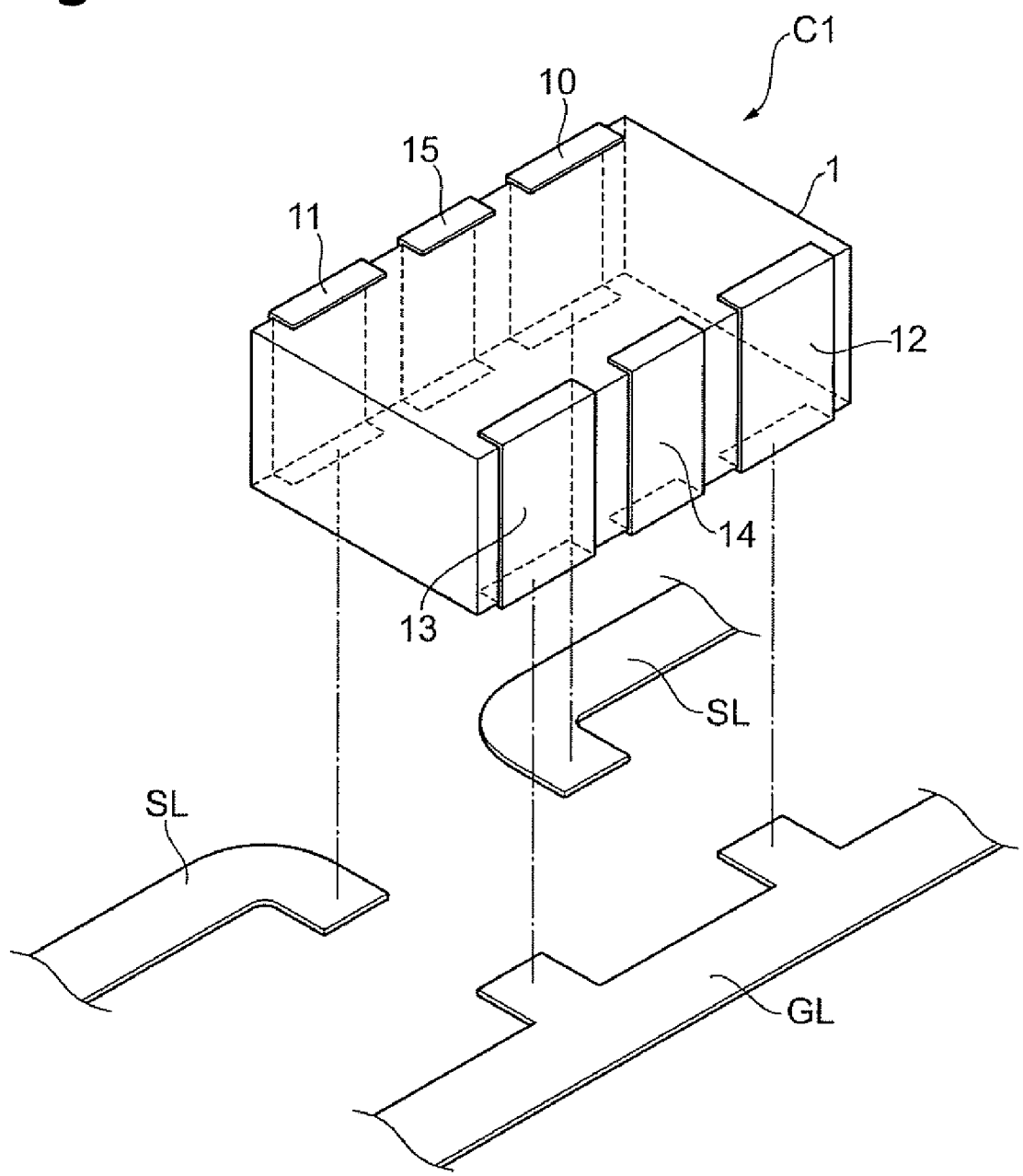
FIG. 5 is a drawing showing a state in which the feedthrough multilayer capacitor of the first embodiment is mounted on another component.

In the feedthrough multilayer capacitor C1, as shown in FIG. 4, there are capacitance components C11, C12 formed by the respective internal electrode groups described above. Namely, the capacitance component C11 is formed by the opposed regions of the main electrode portions 21 of the first signal internal electrodes 20 and the main electrode portions 31 of the first ground internal electrodes 30. The capacitance component C12 is formed by the opposed regions of the main electrode portions 25 of the second signal internal electrodes 24 and the main electrode portions 35 of the second ground internal electrodes 34. The feedthrough multilayer capacitor C1 is mounted on another component, as shown in FIG. 5, in such a manner that the first and second signal terminal electrodes 10, 11 are connected to a signal line SL and that the first and second ground terminal electrodes 12, 13 are connected to a ground line GL. The signal connection conductor 14 and the ground connection conductor 15 are not directly connected to the signal line SL and the ground line GL.

As described above, the first embodiment successfully realizes a circuit in which a capacitor with the capacitance component C11 and a capacitor with the capacitance component C12 are connected in parallel.

In the first embodiment the first signal internal electrode 20 and the second ground internal electrode 34 are located in the same layer and the second signal internal electrode 24 and the first ground internal electrode 30 are located in the same layer. This configuration reduces the number of layers of the internal electrodes and thus permits the feedthrough multilayer capacitor C1 to be constructed in a lower profile.

In the first embodiment the first and second signal terminal electrodes 10, 11 and the ground connection conductor 15 are disposed on the first side face 6 and the first and second ground terminal electrodes 12, 13 and the signal connection conductor 14 are disposed on the second side face 7. This makes the signal connection conductor 14 and the ground connection conductor 15 arranged apart from each other, and thus makes a physically sufficiently large gap between the signal connection conductor 14 and the ground connection conductor 15. This configuration permits the two capacitance components C11, C12 to be formed as more suitably separated from each other.

Figure 6:
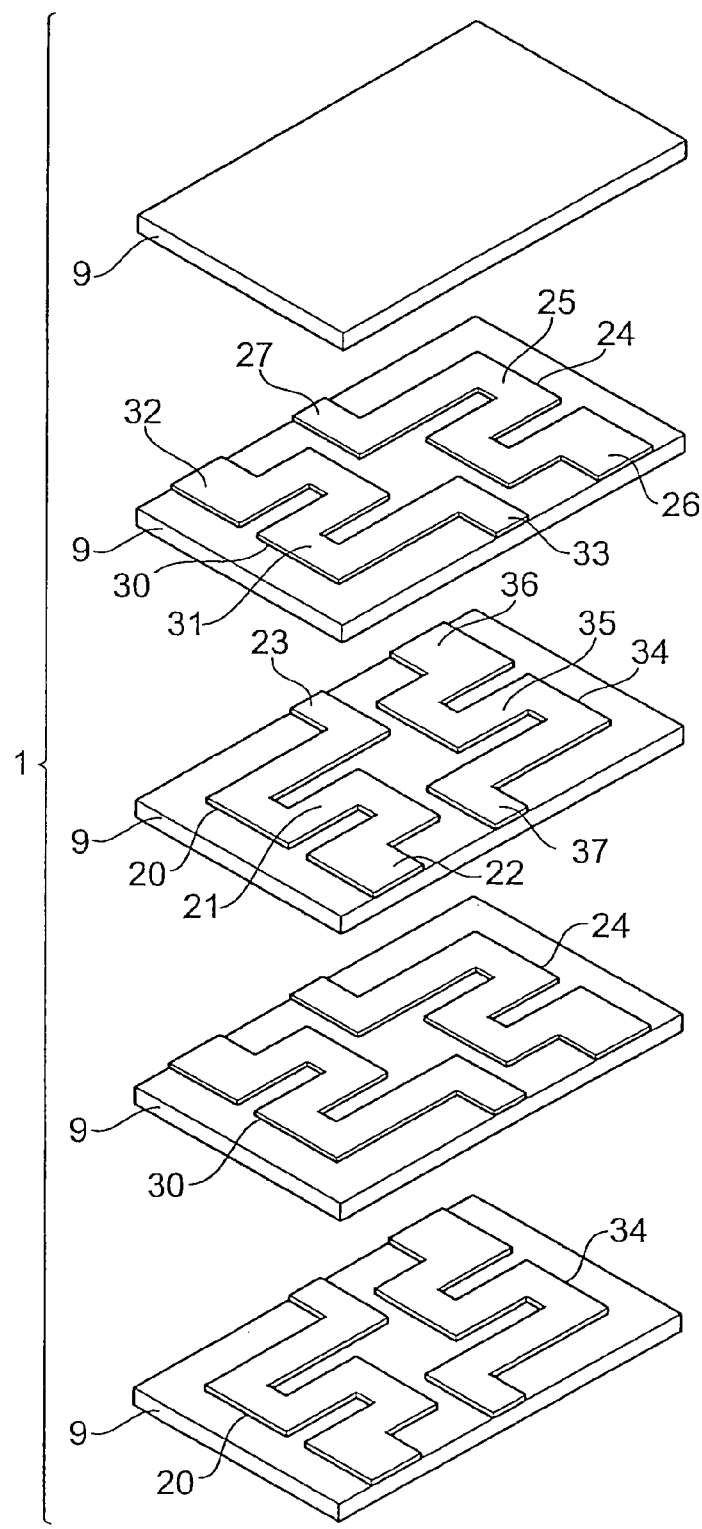
FIG. 6 is an exploded perspective view of a capacitor element body in a feedthrough multilayer capacitor according to a modification example of the first embodiment.

The feedthrough multilayer capacitors C1 according to modification examples of the first embodiment will be described below on the basis of FIGS. 6 to 9. The feedthrough multilayer capacitors of the modification examples are different in the shapes of the first and second signal internal electrodes 20, 24 and the first and second ground internal electrodes 30, 34 from the feedthrough multilayer capacitor C1 of the above-described embodiment. Each of FIG. 6 and FIG. 8 is an exploded perspective view showing the capacitor element body in the feedthrough multilayer capacitor according to the modification example of the first embodiment. Each of FIG. 7 and FIG. 9 is a drawing showing configurations of internal electrodes.

Figure 7:
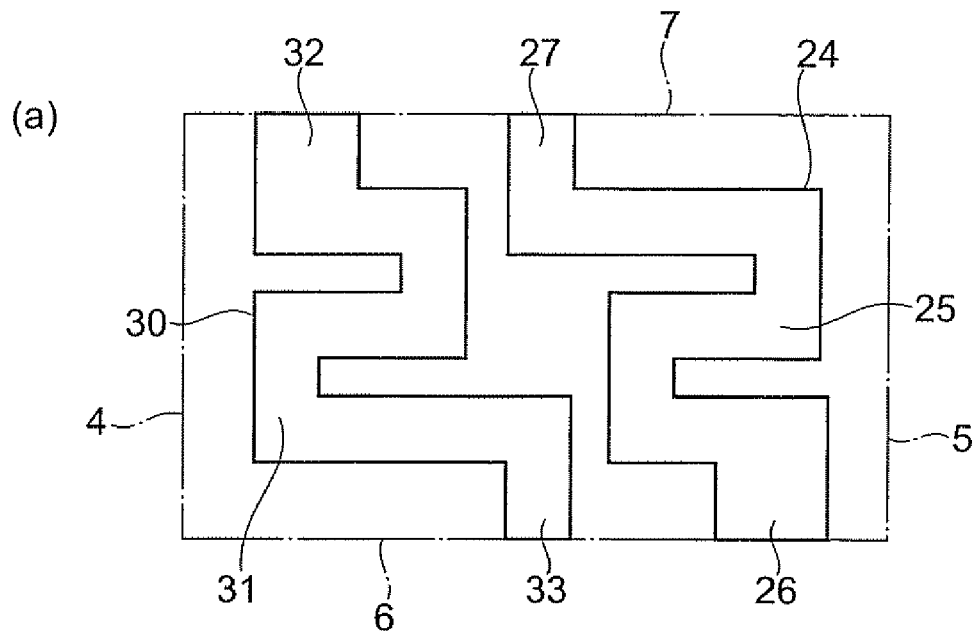
FIG. 7 is a drawing showing configurations of internal electrodes.
Figure 7:
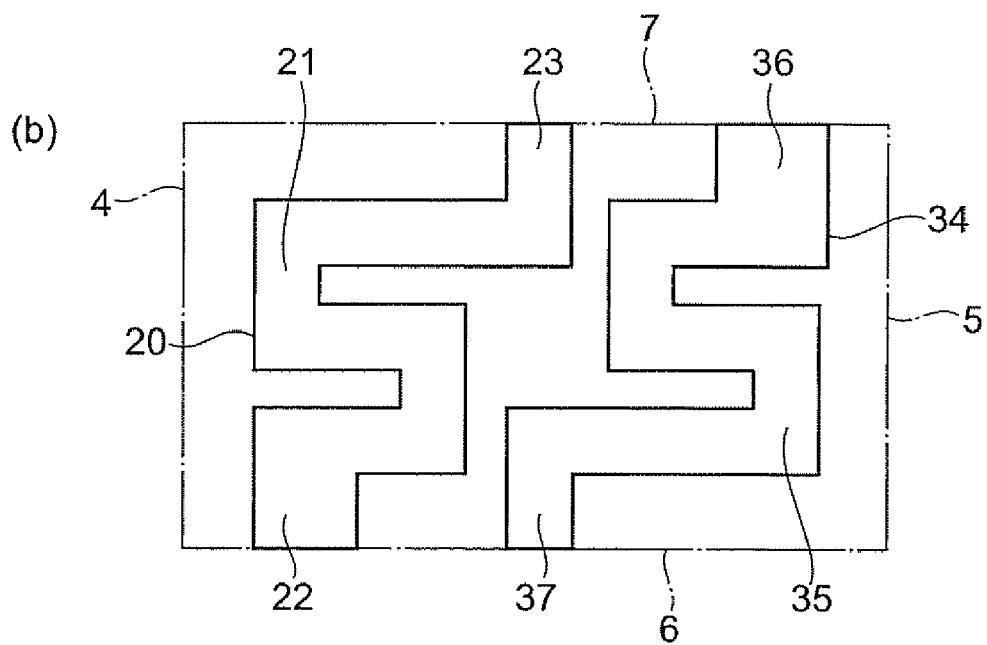
Figure 8:
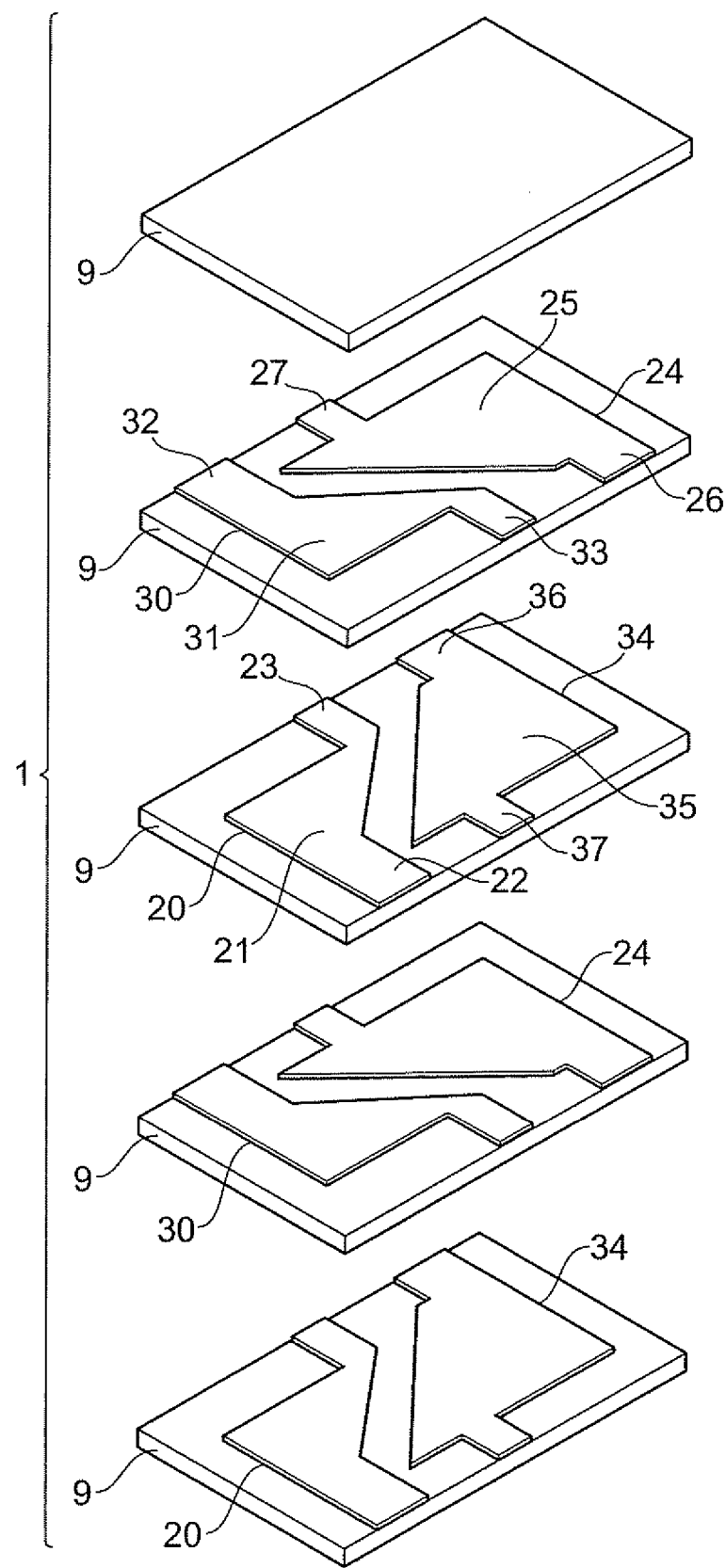
FIG. 8 is an exploded perspective view of a capacitor element body in a feedthrough multilayer capacitor according to another modification example of the first embodiment.

In the modification example shown in FIGS. 6 and 7, each of the main electrode portions 21, 25, 31, 35 of the first and second signal internal electrodes 20, 24 and the first and second ground internal electrodes 30, 34 is of a meander shape. Since each main electrode portion 21, 25, 31, 35 has a narrower width and a longer path length, the first and second signal internal electrodes 20, 24 and the first and second ground internal electrodes 30, 34 come to have a relatively high electric resistance. This permits the feedthrough multilayer capacitor to have large impedance.

Figure 9:
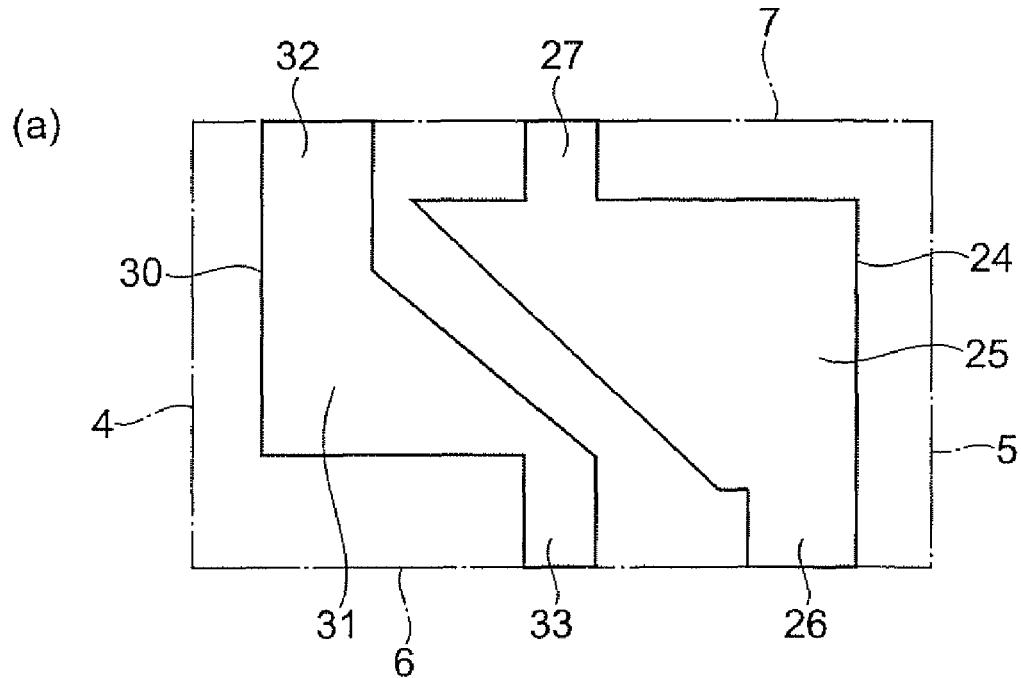
FIG. 9 is a drawing showing configurations of internal electrodes.
Figure 9:
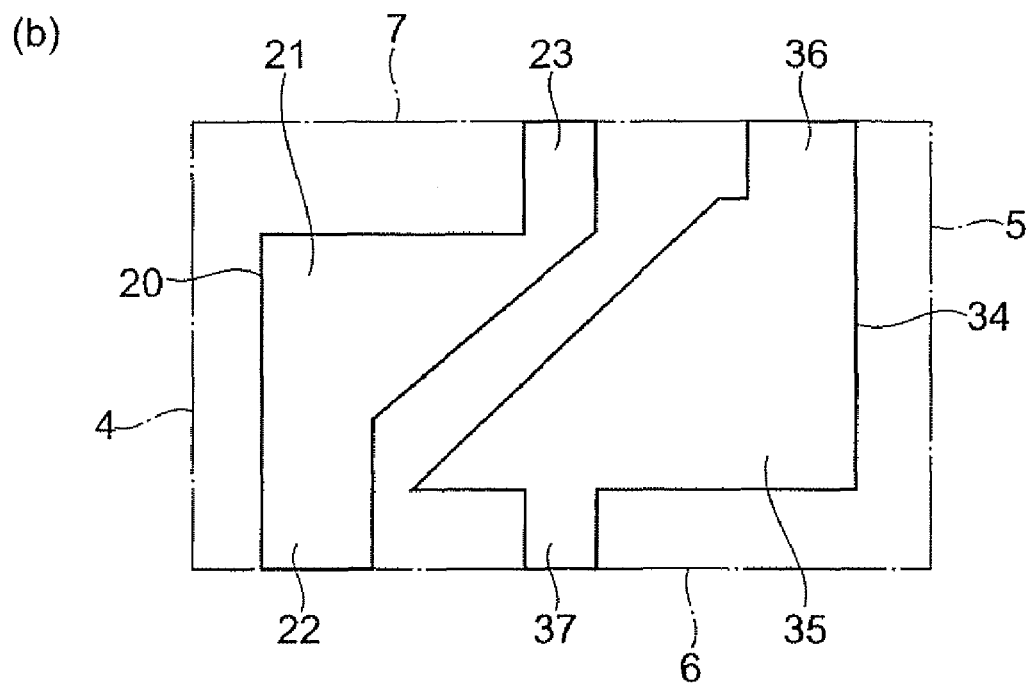

In the modification example shown in FIGS. 8 and 9, the area of the opposed regions of the main electrode portion 21 of the first signal internal electrode 20 and the main electrode portion 31 of the first ground internal electrode 30 is different from that of the opposed regions of the main electrode portion 25 of the second signal internal electrode 24 and the main electrode portion 35 of the second ground internal electrode 34. In the first embodiment, the area of the opposed regions of the main electrode portion 21 of the first signal internal electrode 20 and the main electrode portion 31 of the first ground internal electrode 30 is smaller than the area of the opposed regions of the main electrode portion 25 of the second signal internal electrode 24 and the main electrode portion 35 of the second ground internal electrode 34. Therefore, the capacitance component C11 becomes smaller than the capacitance component C12.

Figure 10:
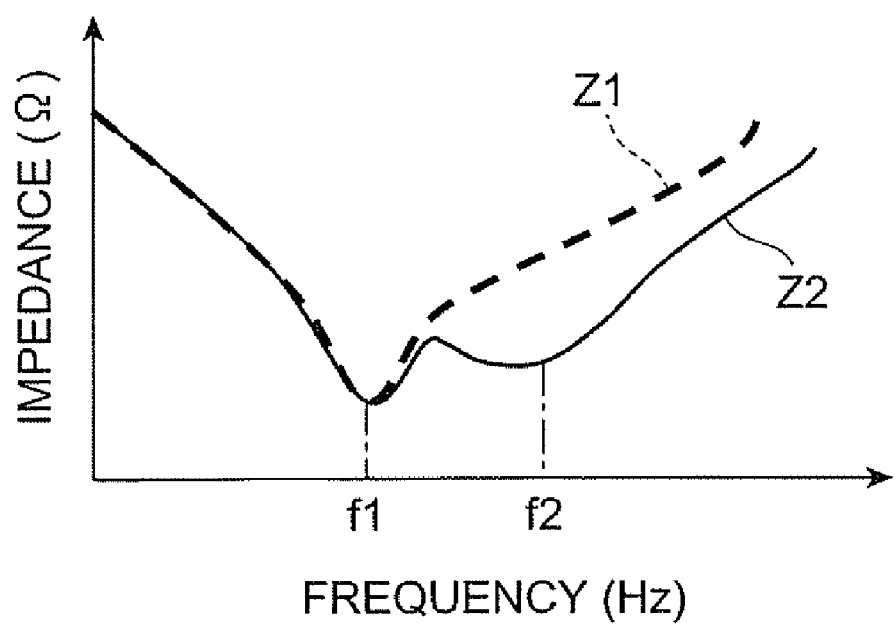
FIG. 10 is a graph showing frequency characteristics of impedance of the feedthrough multilayer capacitors of the first embodiment and the modification example thereof.

FIG. 10 shows a graph of impedance (Q) characteristics against frequency (Hz) of each of the feedthrough multilayer capacitor C1 of the first embodiment and the feedthrough multilayer capacitor of the modification example shown in FIGS. 8 and 9. In the graph shown in FIG. 10, the horizontal axis represents frequency (Hz) and the vertical axis impedance (Ω). The characteristic Z1 indicated by a dashed line in FIG. 10 corresponds to the feedthrough multilayer capacitor C1 of the first embodiment and the characteristic Z2 indicated by a solid line corresponds to the feedthrough multilayer capacitor of the modification example shown in FIGS. 8 and 9.

In the feedthrough multilayer capacitor C1 of the first embodiment, as indicated by the characteristic Z1 in FIG. 10, the two capacitance components formed in the capacitor have the same capacitance value, and thus the capacitor has a minimum point of impedance only at a resonant frequency f1 corresponding to the capacitance. In the feedthrough multilayer capacitor of the modification example shown in FIGS. 8 and 9, as indicated by the characteristic Z2 in FIG. 10, the two capacitance components formed in the capacitor have different capacitance values and thus the capacitor has two minimum points of impedance at different resonant frequencies f1, f2. Since the feedthrough multilayer capacitor of the modification example shown in FIGS. 8 and 9 has the two different capacitance components as described above, the impedance can be kept low over a wide frequency band, when compared with the feedthrough multilayer capacitors with only one capacitance.

Second Embodiment

Figure 11:
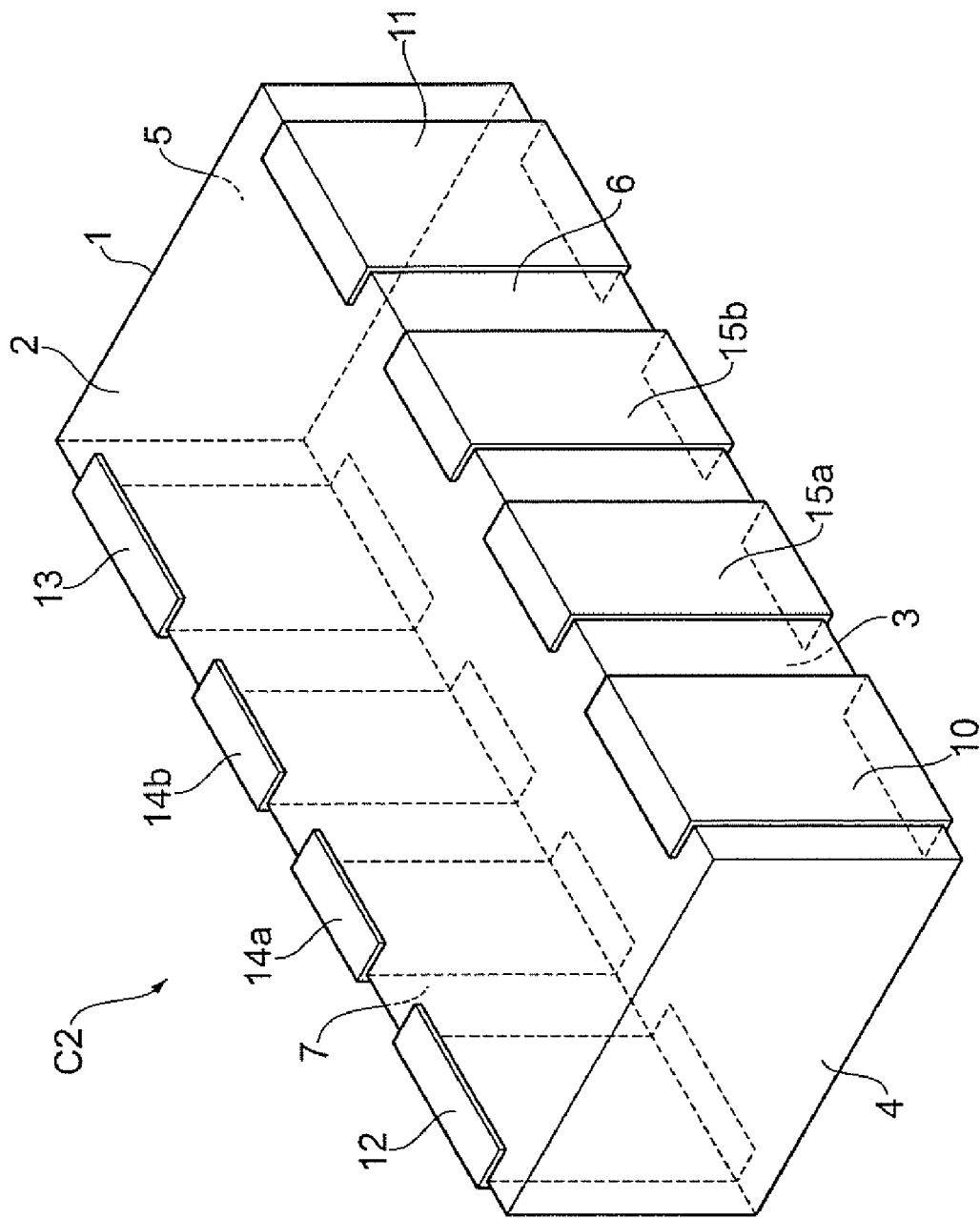
FIG. 11 is a perspective view of a feedthrough multilayer capacitor according to the second embodiment.
Figure 12:
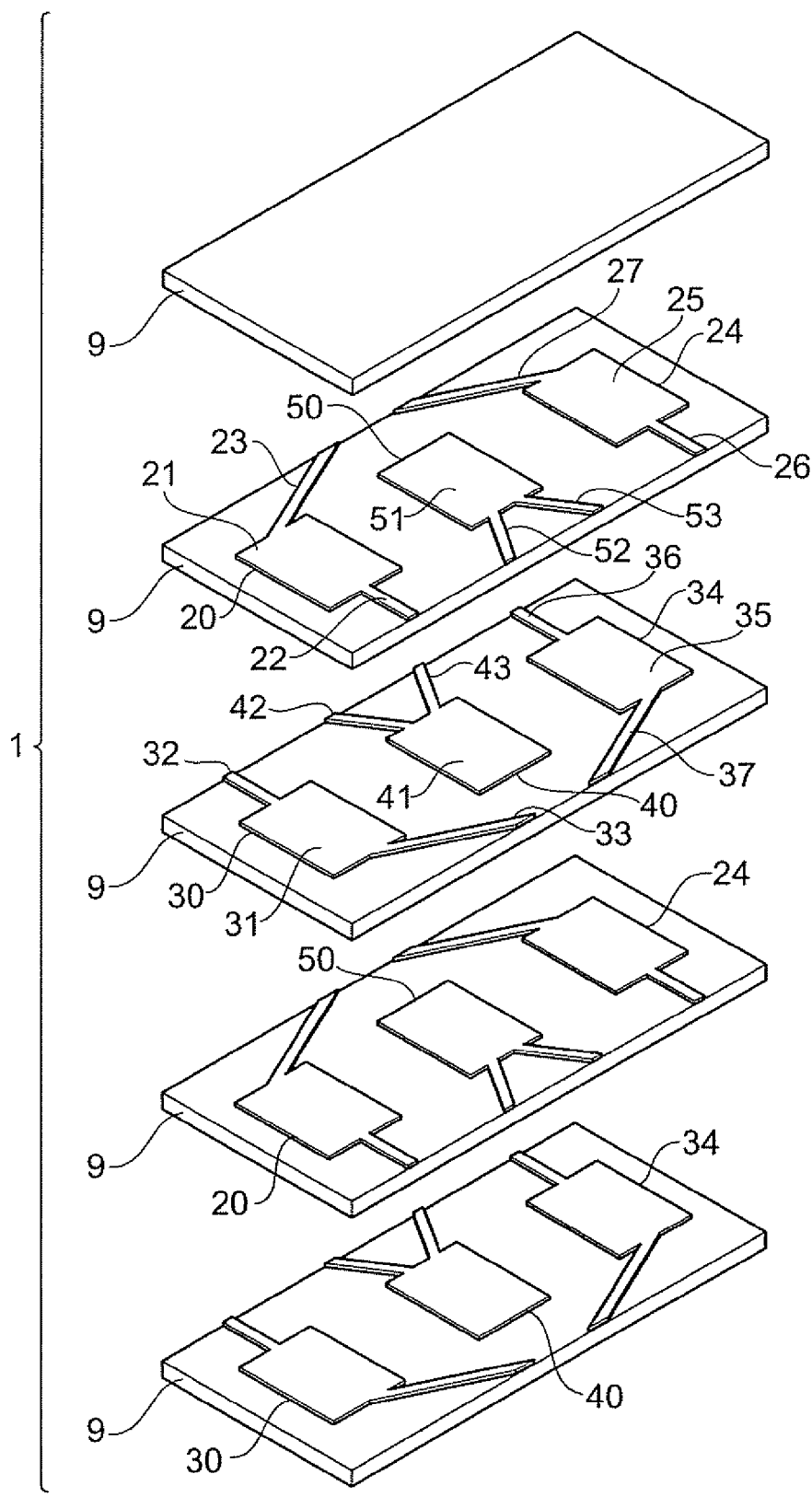
FIG. 12 is an exploded perspective view of a capacitor element body in the feedthrough multilayer capacitor of the second embodiment.
Figure 13:
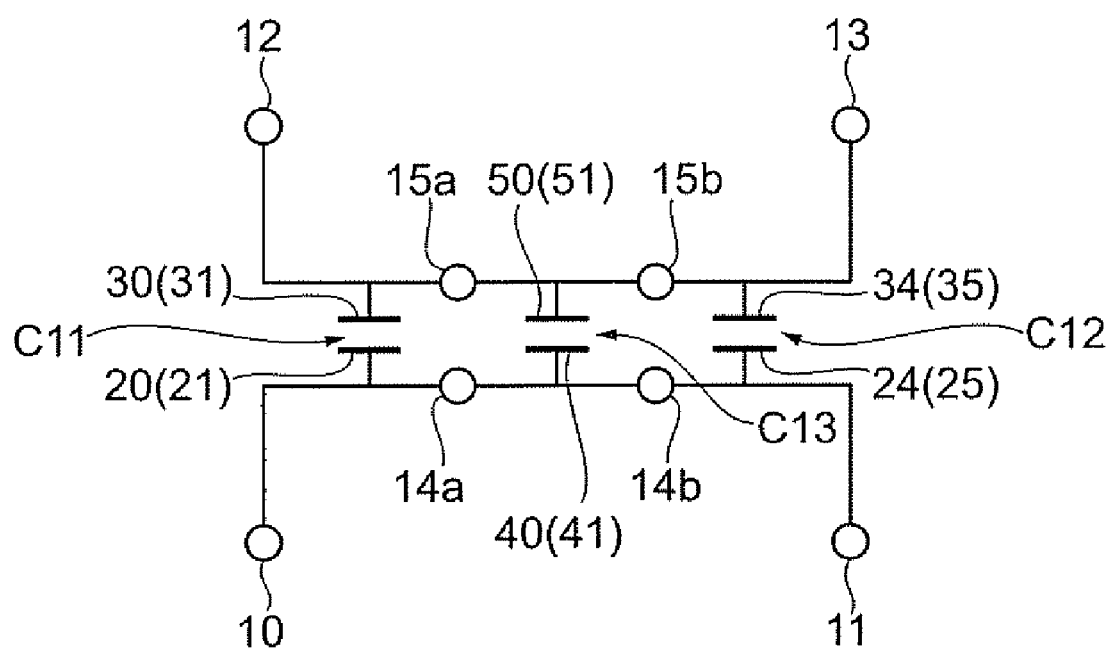
FIG. 13 is an equivalent circuit diagram of the feedthrough multilayer capacitor of the second embodiment.

A configuration of the feedthrough multilayer capacitor C2 according to the second embodiment will be described below with reference to FIGS. 11 to 13. FIG. 11 is a perspective view of the feedthrough multilayer capacitor according to the second embodiment. FIG. 12 is an exploded perspective view of the capacitor element body in the feedthrough multilayer capacitor according to the second embodiment. FIG. 13 is an equivalent circuit diagram of the feedthrough multilayer capacitor according to the second embodiment.

The feedthrough multilayer capacitor C2, as shown in FIG. 11, is provided with a capacitor element body 1, a first signal terminal electrode 10, a second signal terminal electrode 11, a first ground terminal electrode 12, a second ground terminal electrode 13, a first signal connection conductor 14a, a second signal connection conductor 14b, a first ground connection conductor 15a, and a second ground connection conductor 15b.

The first and second signal terminal electrodes 10, 11 and the first and second ground connection conductors 15a, 15b are disposed on the first side face 6 of the capacitor element body 1. Each ground connection conductor 15a, 15b is formed so as to cover a portion of the first side face 6 along the opposed direction of the first and second principal faces 2, 3 and extend up to a certain region of the first and second principal faces 2, 3 as each signal terminal electrode 10, 11 is. The signal terminal electrodes 10, 11 and the ground connection conductors 15a, 15b are electrically isolated from each other on the surface of the capacitor element body 1.

The first and second ground terminal electrodes 12, 13 and the first signal connection conductors 14a, 14b are disposed on the second side face 7 of the capacitor element body 1. Each signal connection conductor 14a, 14b is formed so as to cover a portion of the second side face 7 along the opposed direction of the first and second principal faces 2, 3 and extend up to a certain region of the first and second principal faces 2, 3 as each of the first and second ground terminal electrodes 12, 13 is. The ground terminal electrodes 12, 13 and the signal connection conductors 14a, 14b are electrically isolated from each other on the surface of the capacitor element body 1.

The signal terminal electrodes 10, 11 and the ground connection conductors 15a, 15b are arranged in the order of the first signal terminal electrode 10, the first ground connection conductor 15a, the second ground connection conductor 15b, and the second signal terminal electrode 11 in the direction from the first end face 4 to the second end face 5 on the first side face 6 of the capacitor element body 1. The ground terminal electrodes 12, 13 and the signal connection conductors 14a, 14b are arranged in the order of the first ground terminal electrode 12, the first signal connection conductor 14a, the second signal connection conductor 14b, and the second ground terminal electrode 13 in the direction from the first end face 4 to the second end face 5 on the second side face 7 of the capacitor element body 1.

The first signal terminal electrode 10 and the first ground terminal electrode 12 are opposed in the opposed direction of the first and second side faces 6, 7. The first signal connection conductor 14a and the first ground connection conductor 15a are opposed in the opposed direction of the first and second side faces 6, 7. The second signal connection conductor 14b and the second ground connection conductor 15b are opposed in the opposed direction of the first and second side faces 6, 7. The second signal terminal electrode 11 and the second ground terminal electrode 13 are opposed in the opposed direction of the first and second side faces 6, 7.

Each connection conductor 14a, 14b, 15a, 15b is made, for example, by applying an electroconductive paste containing an electroconductive metal powder and glass frit, onto the exterior of the capacitor element body 1 and baking it, as each terminal electrode 10-13 is. A plated layer is sometimes formed on each connection conductor 14a, 14b, 15a, 15b after baked, according to need.

The feedthrough multilayer capacitor C2, as shown in FIG. 12, is provided with first signal internal electrodes 20, second signal internal electrodes 24, third signal internal electrodes 40, first ground internal electrodes 30, second ground internal electrodes 34, and third ground internal electrodes 50. The internal electrodes 20, 24, 30, 34, 40, 50 are arranged in the capacitor element body 1. The third signal internal electrodes 40 and the third ground internal electrodes 50 are made of an electrically conductive material (e.g., a base metal Ni, or the like) usually used as internal electrodes in a multilayer electric element, as the internal electrodes 20, 24, 30, 34 are. Each internal electrode 20, 24, 30, 34, 40, 50 is constructed as a sintered body of an electroconductive paste containing the aforementioned electrically conductive material.

Each first signal internal electrode 20 has a main electrode portion 21 and two lead portions 22, 23. The first signal connection conductor 14a is formed so as to cover all the exposed portion of the lead portion 23 in the second side face 7. The lead portion 23 is physically and electrically connected to the first signal connection conductor 14a. This makes the first signal internal electrode 20 connected to the first signal terminal electrode 10 and the first signal connection conductor 14a.

Each third signal internal electrode 40 has a main electrode portion 41 and two lead portions 42, 43. The main electrode portion 41 and the two lead portions 42, 43 are integrally formed. Each lead portion 42, 43 extends from the edge of the main electrode portion 41 on the second side face 7 side so that an end thereof is exposed in the second side face 7.

The first signal connection conductor 14a is formed so as to also cover all the exposed portion of the lead portion 42 in the second side face 7. The lead portion 42 is physically and electrically connected to the first signal connection conductor 14a. The second signal connection conductor 14b is formed so as to cover all the exposed portion of the lead portion 43 in the second side face 7. The lead portion 43 is physically and electrically connected to the second signal connection conductor 14b. This makes the third signal internal electrode 40 connected to the first and second connection conductors 14a, 14b.

Each second signal internal electrode 24 has a main electrode portion 25 and two lead portions 26, 27. The second signal connection conductor 14b is formed so as to also cover all the exposed portion of the lead portion 27 in the second side face 7. The lead portion 27 is physically and electrically connected to the second signal connection conductor 14b. This makes the second signal internal electrode 24 connected to the second signal terminal electrode 11 and the second signal connection conductor 14b. The first signal internal electrode 20, the second signal internal electrode 24, and the third signal internal electrode 40 are electrically connected through the first and second signal connection conductors 14a, 14b.

Each first ground internal electrode 30 has a main electrode portion 31 and two lead portions 32, 33. The first ground connection conductor 15a is formed so as to cover all the exposed portion of the lead portion 33 in the first side face 6. The lead portion 33 is physically and electrically connected to the first ground connection conductor 15a. This makes the first ground internal electrode 30 connected to the first ground terminal electrode 12 and the first ground connection conductor 15a.

Each third ground internal electrode 50 has a main electrode portion 51 and two lead portions 52, 53. The main electrode portion 51 and the two lead portions 52, 53 are integrally formed. Each lead portion 52, 53 extends from the edge of the main electrode portion 51 on the first side face 6 side so that an end thereof is exposed in the first side face 6.

The first ground connection conductor 15a is formed so as to also cover all the exposed portion of the lead portion 52 in the first side face 6. The lead portion 52 is physically and electrically connected to the first ground connection conductor 15a. The second ground connection conductor 15b is formed so as to also cover all the exposed portion of the lead portion 53 in the first side face 6. The lead portion 53 is physically and electrically connected to the second ground connection conductor 15b. This makes the third ground internal electrode 50 connected to the first and second ground connection conductors 15a, 15b.

Each second ground internal electrode 34 has a main electrode portion 35 and two lead portions 36, 37. The second ground connection conductor 15b is formed so as to also cover all the exposed portion of the lead portion 37 in the first side face 6. The lead portion 37 is physically and electrically connected to the second ground connection conductor 15b. This makes the second ground internal electrode 34 connected to the second ground terminal electrode 13 and the second ground connection conductor 15b. The first ground internal electrode 30, the second ground internal electrode 34, and the third ground internal electrode 50 are electrically connected through the first and second ground connection conductors 15a, 15b.

The main electrode portion 41 of the third signal internal electrode 40 and the main electrode portion 51 of the third ground internal electrode 50 include their respective regions opposed to each other in the laminating direction of the insulator layers 9 so as to sandwich at least one insulator layer 9 being a portion of the capacitor element body 1. Namely, the third signal internal electrode 40 and the third ground internal electrode 50 have their respective regions opposed to each other in the laminating direction of the insulator layers 9 so as to sandwich a portion of the capacitor element body 1. Therefore, an overlap of the insulator layer 9 with the main electrode portion 41 of the third signal internal electrode 40 and the main electrode portion 51 of the third ground internal electrode 50 is also a region that substantially produces a capacitance component.

The first signal internal electrode 20, the third ground internal electrode 50, and the second signal internal electrode 24 are located in the same layer. The internal electrodes 20, 24, 50 are arranged with a predetermined gap between them and in the order of the first signal internal electrode 20, the third ground internal electrode 50, and the second signal internal electrode 24 in the direction from the first end face 4 to the second end face 5.

The first ground internal electrode 30, the third signal internal electrode 40, and the second ground internal electrode 34 are located in the same layer. The internal electrodes 30, 34, 40 are arranged with a predetermined gap between them and in the order of the first ground internal electrode 30, the third signal internal electrode 40, and the second ground internal electrode 34 in the direction from the first end face 4 to the second end face 5.

The first signal internal electrode 20 and the second and third ground internal electrodes 34, 50 are not opposed in the laminating direction of the insulator layers 9. This results in producing no substantial capacitance component between the first signal internal electrode 20 and the second and third ground internal electrodes 34, 50.

The second signal internal electrode 24 and the first and third ground internal electrodes 30, 50 are not opposed in the laminating direction of the insulator layers 9. This results in producing no substantial capacitance component between the second signal internal electrode 24 and the first and third ground internal electrodes 30, 50.

The third signal internal electrode 40 and the first and second ground internal electrodes 30, 34 are not opposed in the laminating direction of the insulator layers 9. This results in producing no substantial capacitance component between the third signal internal electrode 40 and the first and second ground internal electrodes 30, 34.

In the second embodiment the feedthrough multilayer capacitor C2 is provided with an internal electrode group including the first signal internal electrodes 20 and the first ground internal electrodes 30, another internal electrode group including the second signal internal electrodes 24 and the second ground internal electrodes 34, and still another internal electrode group including the third signal internal electrodes 40 and the third ground internal electrodes 50. The first signal internal electrode 20, the second signal internal electrode 24, and the third signal internal electrode 40 are electrically connected to each other through the first and second signal connection conductors 14a, 14b and the first ground internal electrode 30, the second ground internal electrode 34, and the third ground internal electrode 50 are electrically connected to each other through the first and second ground connection conductors 15a, 15b. The aforementioned three internal electrode groups are juxtaposed in the opposed direction of the first and second end faces 4, 5 in the capacitor element body 1.

In the feedthrough multilayer capacitor C2, as shown in FIG. 13, there are capacitance components C11, C12, C13 formed by the respective internal electrode groups described above. Namely, the capacitance component C11 is formed by the opposed regions of the main electrode portions 21 of the first signal internal electrodes 20 and the main electrode portions 31 of the first ground internal electrodes 30. The capacitance component C12 is formed by the opposed regions of the main electrode portions 25 of the second signal internal electrodes 24 and the main electrode portions 35 of the second ground internal electrodes 34. The capacitance component C13 is formed by the opposed regions of the main electrode portions 41 of the third signal internal electrodes 40 and the main electrode portions 51 of the third ground internal electrodes 50.

As described above, the second embodiment also successfully realizes a circuit in which a capacitor with the capacitance component C11, a capacitor with the capacitance component C12, and a capacitance with the capacitance component C13 are connected in parallel.

Third Embodiment

Figure 14:
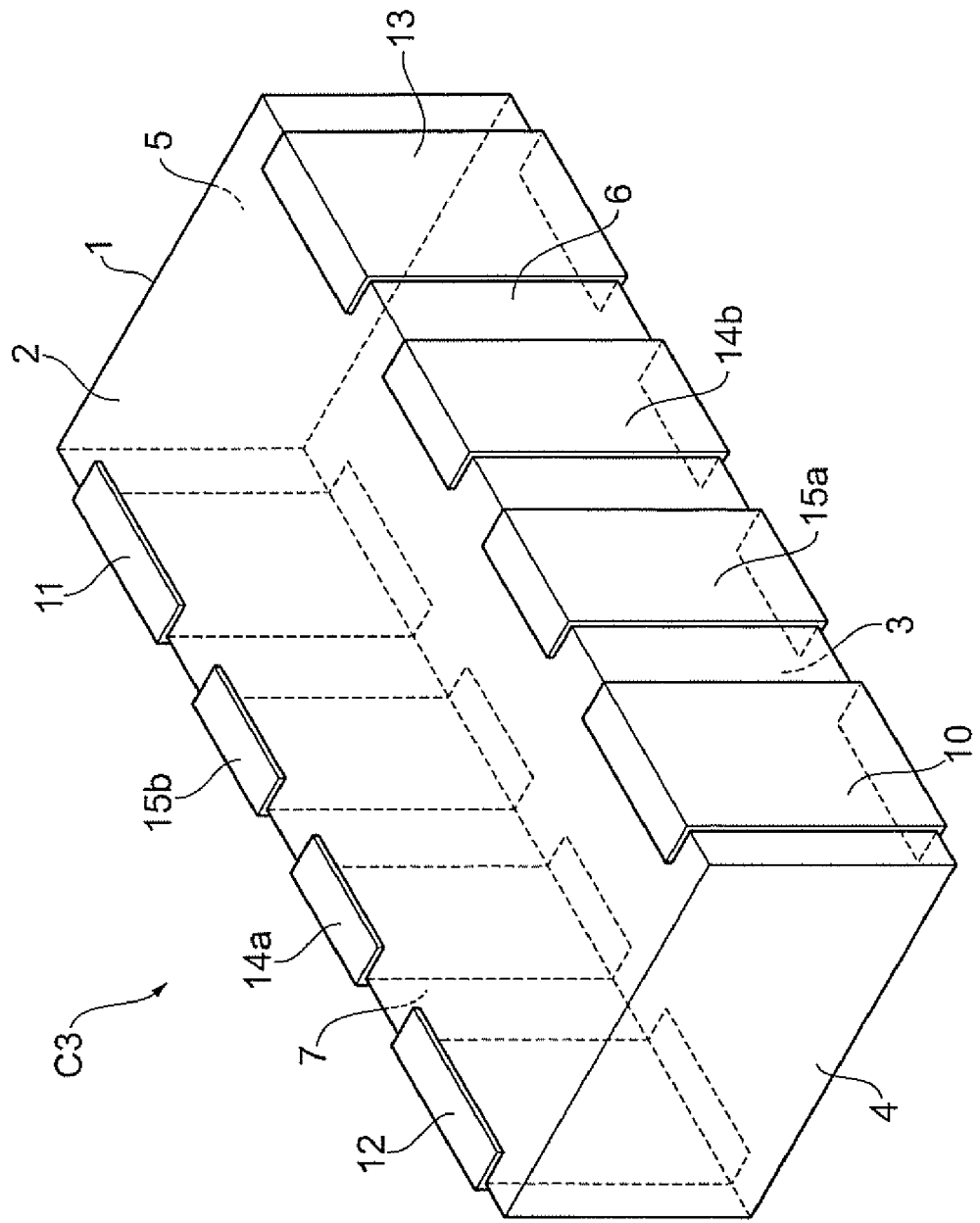
FIG. 14 is a perspective view of a feedthrough multilayer capacitor according to the third embodiment.
Figure 15:
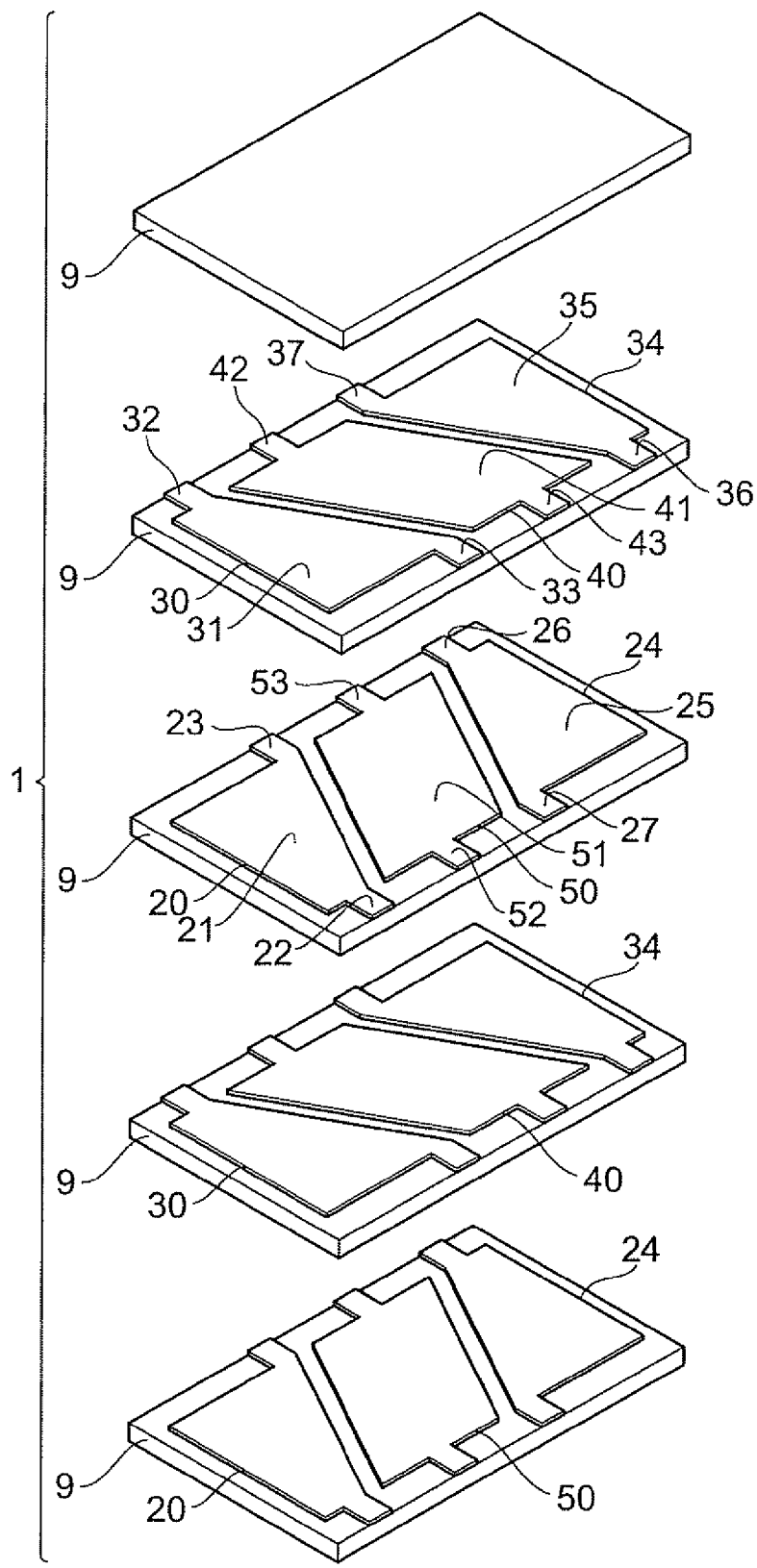
FIG. 15 is an exploded perspective view of a capacitor element body in the feedthrough multilayer capacitor of the third embodiment.
Figure 16:
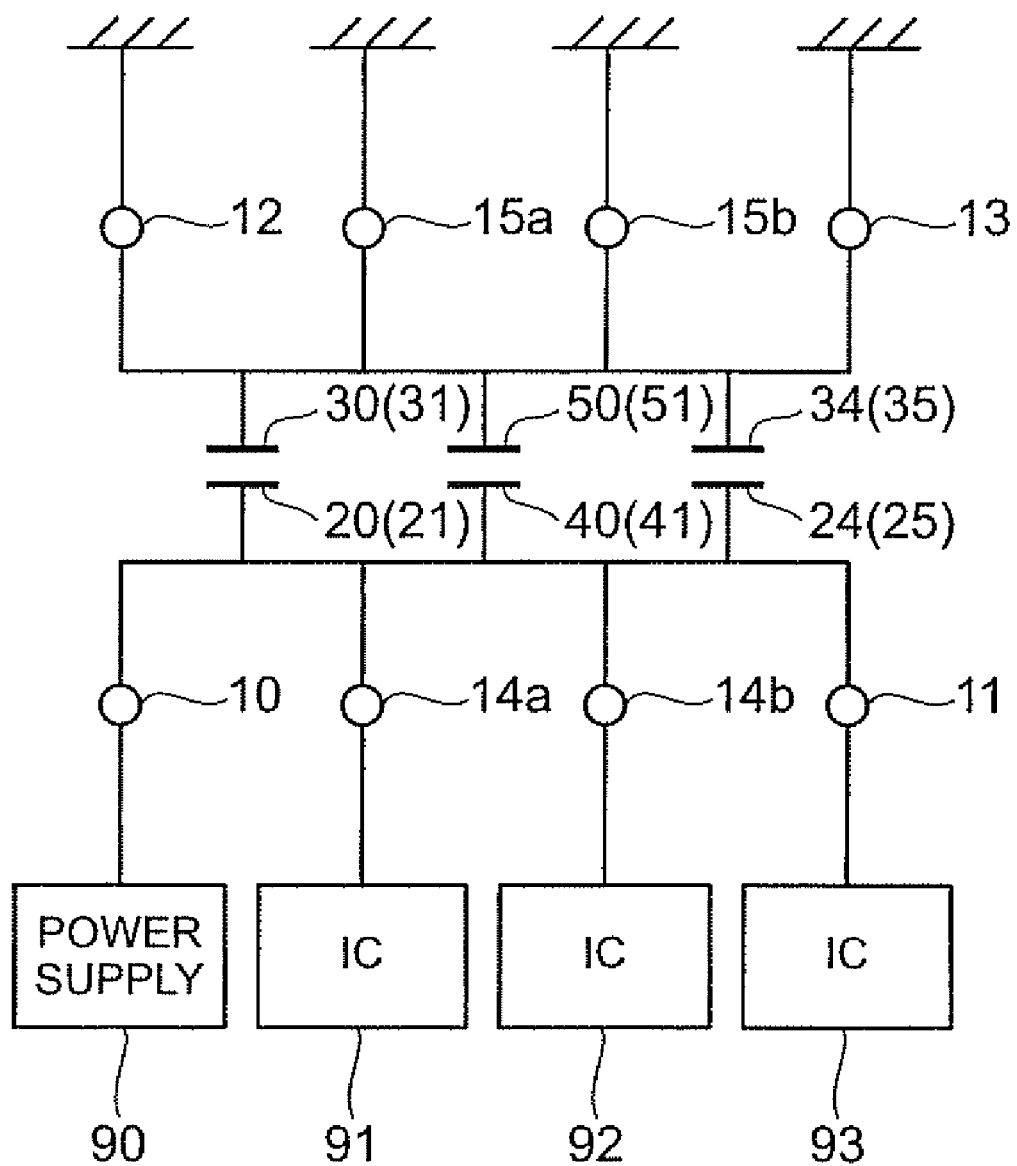
FIG. 16 is an equivalent circuit diagram showing an example of a noise removing circuit using the feedthrough multilayer capacitor of the third embodiment.

A configuration of the feedthrough multilayer capacitor C3 according to the third embodiment will be described below with reference to FIGS. 14 to 16. FIG. 14 is a perspective view of the feedthrough multilayer capacitor according to the third embodiment. FIG. 15 is an exploded perspective view of the capacitor element body in the feedthrough multilayer capacitor according to the third embodiment. FIG. 16 is an equivalent circuit diagram showing an example of a noise removing circuit using the feedthrough multilayer capacitor according to the third embodiment.

The feedthrough multilayer capacitor C3, as shown in FIG. 14, is provided with a capacitor element body 1, a first signal terminal electrode 10, a second signal terminal electrode 11, a first ground terminal electrode 12, a second ground terminal electrode 13, a first signal connection conductor 14a, a second signal connection conductor 14b, a first ground connection conductor 15a, and a second ground connection conductor 15b.

The first signal terminal electrode 10, the second ground terminal electrode 13, the second signal connection conductor 14b, and the first ground connection conductor 15a are disposed on the first side face 6 of the capacitor element body 1. The terminal electrodes 10, 13 and the connection conductors 14b, 15a are arranged in the order of the first signal terminal electrode 10, the first ground connection conductor 15a, the second signal connection conductor 14b, and the second ground terminal electrode 13 in the direction from the first end face 4 to the second end face 5 on the first side face 6 of the capacitor element body 1. The terminal electrodes 10, 13 and the connection conductors 14b, 15a are electrically isolated from each other on the surface of the capacitor element body 1.

The second signal terminal electrode 11, the first ground terminal electrode 12, the first signal connection conductor 14a, and the second ground connection conductor 15b are disposed on the second side face 7 of the capacitor element body 1. The terminal electrodes 11, 12 and the connection conductors 14a, 15b are arranged in the order of the first ground terminal electrode 12, the first signal connection conductor 14a, the second ground connection conductor 15b, and the second signal terminal electrode 11 in the direction from the first end face 4 to the second end face 5 on the second side face 7 of the capacitor element body 1. The terminal electrodes 11, 12 and the connection conductors 14a, 15b are electrically isolated from each other on the surface of the capacitor element body 1.

The feedthrough multilayer capacitor C3, as shown in FIG. 15, is provided with first signal internal electrodes 20, second signal internal electrodes 24, third signal internal electrodes 40, first ground internal electrodes 30, second ground internal electrodes 34, and third ground internal electrodes 50. The internal electrodes 20, 24, 30, 34, 40, 50 are arranged in the capacitor element body 1.

Each first signal internal electrode 20 is connected to the first signal terminal electrode 10 and the first signal connection conductor 14a.

The lead portion 43 of the third signal internal electrode 40 extends from the edge of the main electrode portion 41 on the first side face 6 side so that an end thereof is exposed in the first side face 6. The second signal connection conductor 14b is formed so as to cover all the exposed portion of the lead portion 43 in the first side face 6. The lead portion 43 is physically and electrically connected to the second signal connection conductor 14b. This makes the third signal internal electrode 40 connected to the first and second signal connection conductors 14a, 14b.

The lead portion 27 of the second signal internal electrode 24 extends from the edge of the main electrode portion 25 on the first side face 6 side so that an end thereof is exposed in the first side face 6. The second signal connection conductor 14b is formed so as to also cover all the exposed portion of the lead portion 27 in the first side face 6. The lead portion 27 is physically and electrically connected to the second signal connection conductor 14b. The lead portion 26 of the second signal internal electrode 24 extends from the edge of the main electrode portion 25 on the second side face 7 side so that an end thereof is exposed in the second side face 7. The second signal terminal electrode 11 is formed so as to also cover all the exposed portion of the lead portion 26 in the second side face 7. The lead portion 26 is physically and electrically connected to the second signal terminal electrode 11. These make the second signal internal electrode 24 connected to the second signal terminal electrode 11 and the second signal connection conductor 14b.

Each first ground internal electrode 30 is connected to the first ground terminal electrode 12 and the first ground connection conductor 15a.

The lead portion 53 of the third ground internal electrode 50 extends from the edge of the main electrode portion 51 on the second side face 7 side so that an end thereof is exposed in the second side face 7. The second ground connection conductor 15b is formed so as to also cover all the exposed portion of the lead portion 53 in the second side face 7. The lead portion 53 is physically and electrically connected to the second ground connection conductor 15b. This makes the third ground internal electrode 50 connected to the first and second ground connection conductors 15a, 15b.

The lead portion 37 of the second ground internal electrode 34 extends from the edge of the main electrode portion 35 on the second side face 7 side so that an end thereof is exposed in the second side face 7. The second ground connection conductor 15b is formed so as to also cover all the exposed portion of the lead portion 37 in the second side face 7. The lead portion 37 is physically and electrically connected to the second ground connection conductor 15b. The lead portion 36 of the second ground internal electrode 34 extends from the edge of the main electrode portion 35 on the first side face 6 side so that an end thereof is exposed in the first side face 6. The second ground terminal electrode 13 is formed so as to also cover all the exposed portion of the lead portion 36 in the first side face 6. The lead portion 36 is physically and electrically connected to the second ground terminal electrode 13. These make the second ground internal electrode 34 connected to the second ground terminal electrode 13 and the second ground connection conductor 15b.

The first signal internal electrode 20, the second signal internal electrode 24, and the third signal internal electrode 40 are electrically connected through the first and second signal connection conductors 14a, 14b. The first ground internal electrode 30, the second ground internal electrode 34, and the third ground internal electrode 50 are electrically connected through the first and second ground connection conductors 15a, 15b.

As described above, the third embodiment also successfully realizes a circuit in which the following capacitors are connected in parallel: a capacitor with a capacitance component made by the opposed regions of the main electrode portions 21 of the first signal internal electrodes 20 and the main electrode portions 31 of the first ground internal electrodes 30; a capacitor with a capacitance component made by the opposed regions of the main electrode portions 25 of the second signal internal electrodes 24 and the main electrode portions 35 of the second ground internal electrodes 34; a capacitor with a capacitance component made by the opposed regions of the main electrode portions 41 of the third signal internal electrodes 40 and the main electrode portions 51 of the third ground internal electrodes 50.

The feedthrough multilayer capacitor C3 of the third embodiment is applicable to a noise removing circuit, as shown in FIG. 16. As shown in FIG. 16, the first signal terminal electrode 10 is connected to a power-supply circuit 90, and the first signal connection conductor 14a, the second signal connection conductor 14b, and the second signal terminal electrode 11 are connected to respective different IC circuits 91-93. The first ground terminal electrode 12, the second ground terminal electrode 13, the first ground connection conductor 15a, and the second ground connection conductor 15b are connected to the ground (GND). In the noise removing circuit shown in FIG. 16, the single feedthrough multilayer capacitor C3 is able to remove noise from the plurality of IC circuits 91-93 (three circuits in the present embodiment).

Fourth Embodiment

Figure 17:
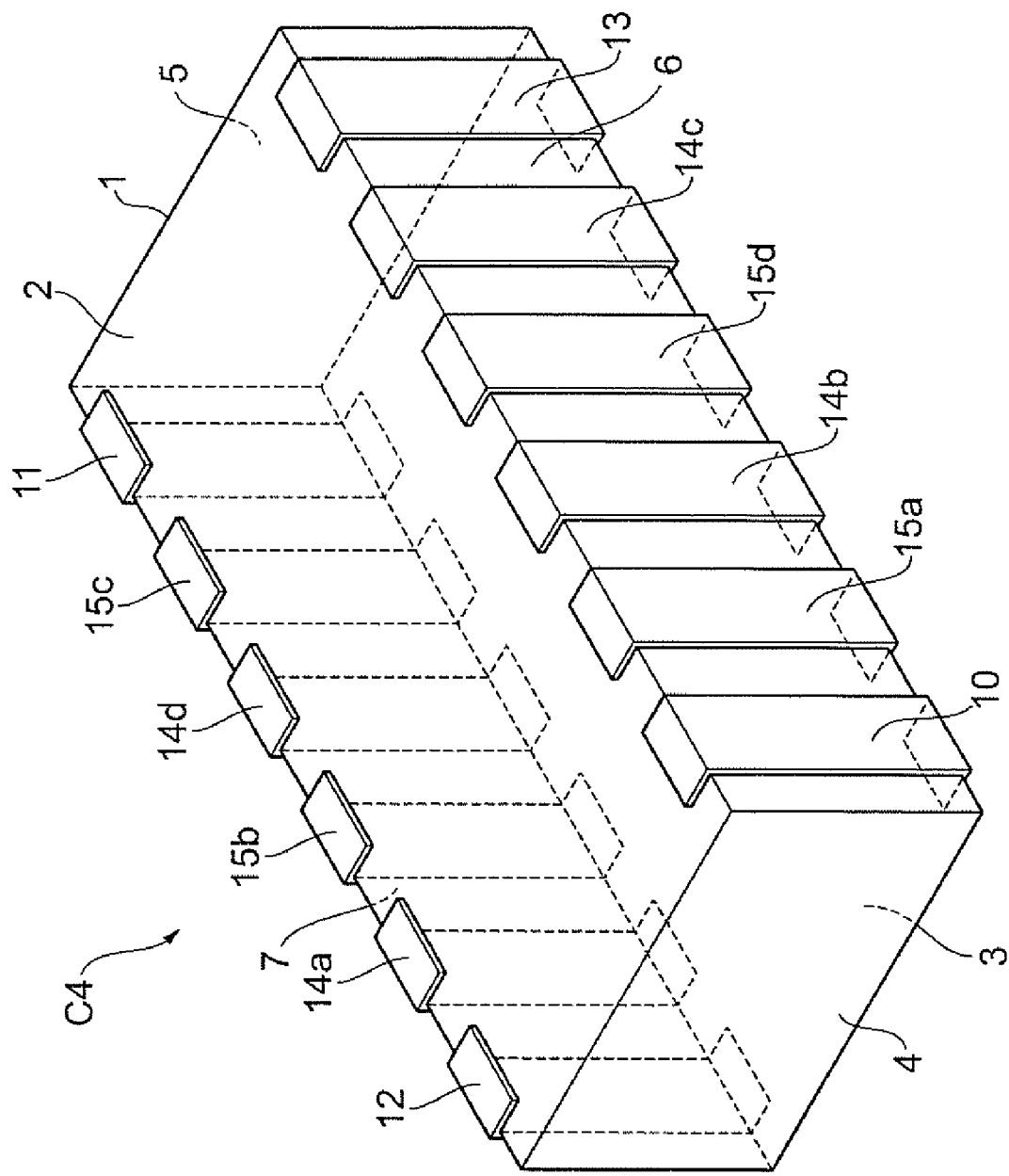
FIG. 17 is a perspective view of a feedthrough multilayer capacitor according to the fourth embodiment.
Figure 18:
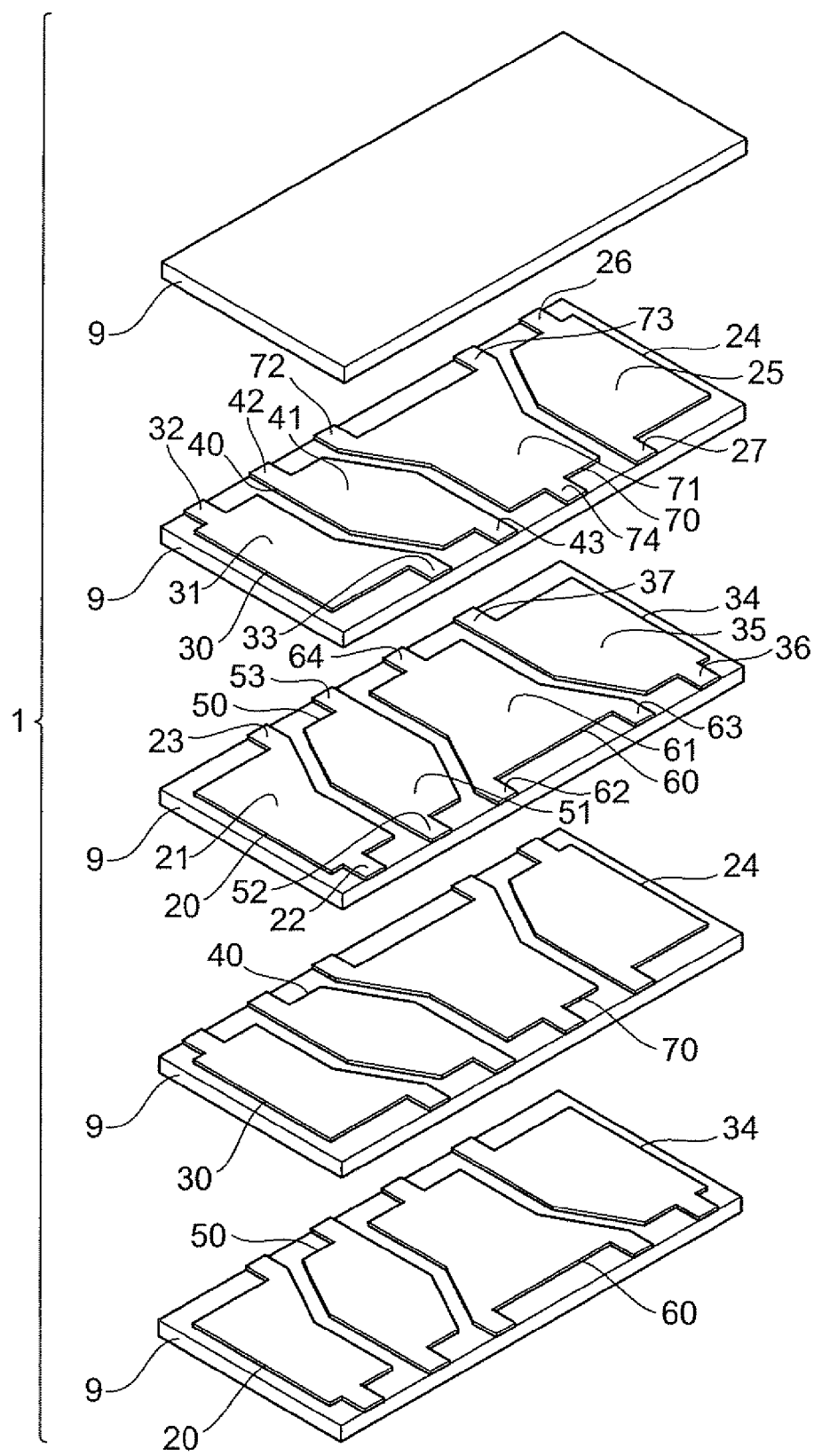
FIG. 18 is an exploded perspective view of a capacitor element body in the feedthrough multilayer capacitor of the fourth embodiment.
Figure 19:
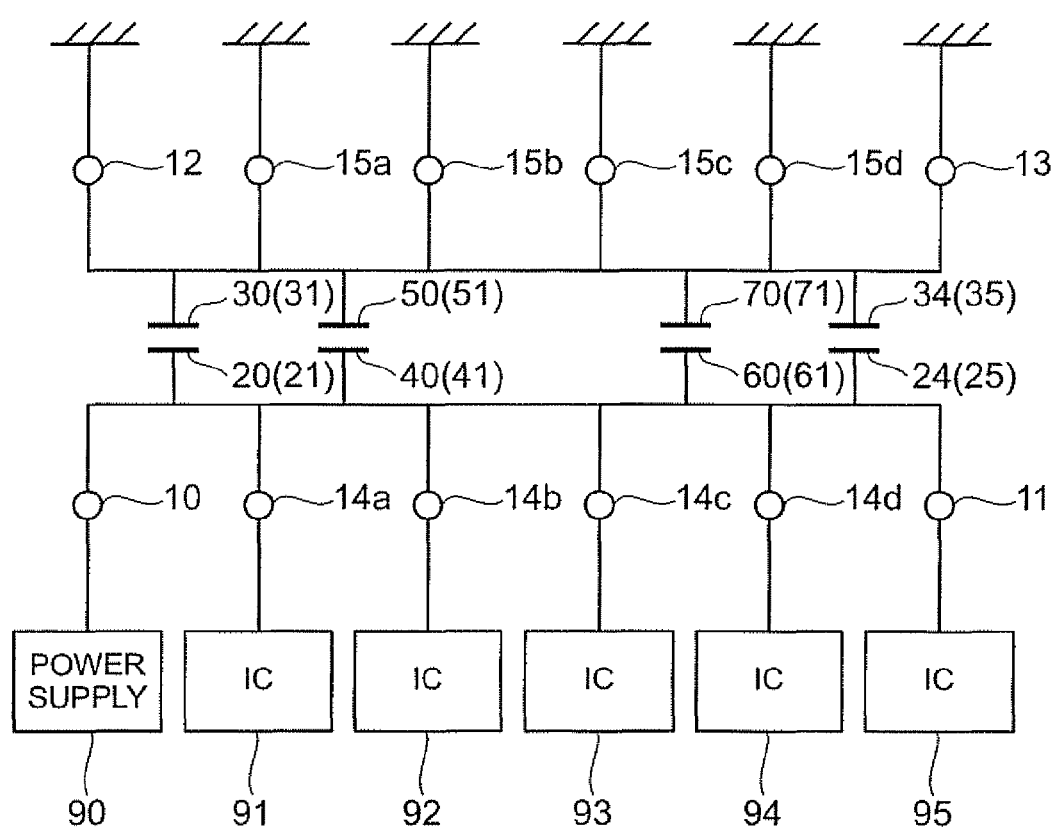
FIG. 19 is an equivalent circuit diagram showing an example of a noise removing circuit using the feedthrough multilayer capacitor of the fourth embodiment.

A configuration of the feedthrough multilayer capacitor C4 according to the fourth embodiment will be described below with reference to FIGS. 17 to 19. FIG. 17 is a perspective view of the feedthrough multilayer capacitor according to the fourth embodiment. FIG. 18 is an exploded perspective view of the capacitor element body in the feedthrough multilayer capacitor according to the fourth embodiment. FIG. 19 is an equivalent circuit diagram showing an example of a noise removing circuit using the feedthrough multilayer capacitor according to the fourth embodiment.

The feedthrough multilayer capacitor C4, as shown in FIG. 17, is provided with a capacitor element body 1, a first signal terminal electrode 10, a second signal terminal electrode 11, a first ground terminal electrode 12, a second ground terminal electrode 13, first to fourth signal connection conductors 14a-14d, and first to fourth ground connection conductors 15a-15d.

The first signal terminal electrode 10, the second ground terminal electrode 13, the second signal connection conductor 14b, the third signal connection conductor 14c, the first ground connection conductor 15a, and the fourth ground connection conductor 15d are disposed on the first side face 6 of the capacitor element body 1. The terminal electrodes 10, 13 and the connection conductors 14b, 14c, 15a, 15d are arranged in the order of the first signal terminal electrode 10, the first ground connection conductor 15a, the second signal connection conductor 14b, the fourth ground connection conductor 15d, the third signal connection conductor 14c, and the second ground terminal electrode 13 in the direction from the first end face 4 to the second end face 5 on the first side face 6 of the capacitor element body 1. The terminal electrodes 10, 13 and the connection conductors 14b, 14c, 15a, 15d are electrically isolated from each other on the surface of the capacitor element body 1.

The second signal terminal electrode 11, the first ground terminal electrode 12, the first signal connection conductor 14a, the fourth signal connection conductor 14d, the second ground connection conductor 15b, and the third ground connection conductor 15c are disposed on the second side face 7 of the capacitor element body 1. The terminal electrodes 11, 12 and the connection conductors 14a, 14d, 15b, 15c are arranged in the order of the first ground terminal electrode 12, the first signal connection conductor 14a, the second ground connection conductor 15b, the fourth signal connection conductor 14d, the third ground connection conductor 15c, and the second signal terminal electrode 11 in the direction from the first end face 4 to the second end face 5 on the second side face 7 of the capacitor element body 1. The terminal electrodes 11, 12 and the connection conductors 14a, 14d, 15b, 15c are electrically isolated from each other on the surface of the capacitor element body 1.

The feedthrough multilayer capacitor C4, as shown in FIG. 18, is provided with first signal internal electrodes 20, second signal internal electrodes 24, third signal internal electrodes 40, fourth signal internal electrodes 60, first ground internal electrodes 30, second ground internal electrodes 34, third ground internal electrodes 50, and fourth ground internal electrodes 70. The internal electrodes 20, 24, 30, 34, 40, 50, 60, 70 are arranged in the capacitor element body 1.

Each first signal internal electrode 20 is connected to the first signal terminal electrode 10 and the first signal connection conductor 14a. Each third signal internal electrode 40 is connected to the first and second signal connection conductors 14a, 14b.

Each fourth signal internal electrode 60 has a main electrode portion 61 and three lead portions 62-64. The main electrode portion 61 and the three lead portions 62-64 are integrally formed. Each lead portion 62, 63 extends from the edge of the main electrode portion 61 on the first side face 6 side so that an end thereof is exposed in the first side face 6. The lead portion 64 extends from the edge of the main electrode portion 61 on the second side face 7 side so that an end thereof is exposed in the second side face 7.

The second signal connection conductor 14b is formed so as to also cover all the exposed portion of the lead portion 62 in the first side face 6. The lead portion 62 is physically and electrically connected to the second signal connection conductor 14b. The third signal connection conductor 14c is formed so as to cover all the exposed portion of the lead portion 63 in the first side face 6. The lead portion 63 is physically and electrically connected to the second signal connection conductor 14c. The fourth signal connection conductor 14d is formed so as to also cover all the exposed portion of the lead portion 64 in the second side face 7. The lead portion 64 is physically and electrically connected to the fourth signal connection conductor 14d. These make the fourth signal internal electrode 60 connected to the second to fourth signal connection conductors 14b-14d.

The third signal connection conductor 14c is formed so as to also cover all the exposed portion of the lead portion 27 in the first side face 6. The lead portion 27 is physically and electrically connected to the third signal connection conductor 14c. This makes the second signal internal electrode 24 connected to the second signal terminal electrode 11 and the third signal connection conductor 14c.

Each first ground internal electrode 30 is connected to the first ground terminal electrode 12 and the first ground connection conductor 15a. Each third ground internal electrode 50 is connected to the first and second ground connection conductors 15a, 15b.

Each fourth ground internal electrode 70 has a main electrode portion 71 and three lead portions 72-74. The main electrode portion 71 and the three lead portions 72-74 are integrally formed. Each lead portion 72, 73 extends from the edge of the main electrode portion 71 on the second side face 7 side so that an end thereof is exposed in the second side face 7. The lead portion 74 extends from the edge of the main electrode portion 71 on the first side face 6 side so that an end thereof is exposed in the first side face 6.

The second ground connection conductor 15b is formed so as to also cover all the exposed portion of the lead portion 72 in the second side face 7. The lead portion 72 is physically and electrically connected to the second ground connection conductor 15b. The third ground connection conductor 15c is formed so as to cover all the exposed portion of the lead portion 73 in the second side face 7. The lead portion 73 is physically and electrically connected to the third ground connection conductor 15c. The fourth ground connection conductor 15d is formed so as to also cover all the exposed portion of the lead portion 74 in the first side face 6. The lead portion 74 is physically and electrically connected to the fourth ground connection conductor 15d. These make the fourth ground internal electrode 70 connected to the second to fourth ground connection conductors 15b-15d.

The third ground connection conductor 15c is formed so as to also cover all the exposed portion of the lead portion 37 in the second side face 7. The lead portion 37 is physically and electrically connected to the third ground connection conductor 15c. This makes the second ground internal electrode 34 connected to the second ground terminal electrode 13 and the third ground connection conductor 15c.

The first signal internal electrode 20, the second signal internal electrode 24, the third signal internal electrode 40, and the fourth signal internal electrode 60 are electrically connected through the first to third signal connection conductors 14a-14c. The first ground internal electrode 30, the second ground internal electrode 34, the third ground internal electrode 50, and the fourth ground internal electrode 70 are electrically connected through the first to third ground connection conductors 15a-15c.

The main electrode portion 61 of the fourth signal internal electrode 60 and the main electrode portion 71 of the fourth ground internal electrode 70 include their respective regions opposed to each other in the laminating direction of the insulator layers 9 so as to sandwich at least one insulator layer 9 being a portion of the capacitor element body 1. Namely, the fourth signal internal electrode 60 and the fourth ground internal electrode 70 have their respective regions opposed to each other in the laminating direction of the insulator layers 9 so as to sandwich a portion of the capacitor element body 1. Therefore, an overlap of the insulator layer 9 with the main electrode portion 61 of the fourth signal internal electrode 60 and the main electrode portion 71 of the fourth ground internal electrode 70 is also a region that substantially produces a capacitance component.

The first signal internal electrode 20, the fourth signal internal electrode 60, the third ground internal electrode 50, and the second ground internal electrode 34 are located in the same layer. The internal electrodes 20, 34, 50, 60 are arranged with a predetermined gap between them and in the order of the first signal internal electrode 20, the third ground internal electrode 50, the fourth signal internal electrode 60, and the second ground internal electrode 34 in the direction from the first end face 4 to the second end face 5.

The second signal internal electrode 24, the first ground internal electrode 30, the third signal internal electrode 40, and the fourth ground internal electrode 70 are located in the same layer. The internal electrodes 24, 30, 40, 70 are arranged with a predetermined gap between them and in the order of the first ground internal electrode 30, the third signal internal electrode 40, the fourth ground internal electrode 70, and the second signal internal electrode 24 in the direction from the first end face 4 to the second end face 5.

The first signal internal electrode 20 is not opposed to the second to fourth ground internal electrodes 34, 50, 70 in the laminating direction of the insulator layers 9. This results in producing no substantial capacitance component between the first signal internal electrode 20 and the second to fourth ground internal electrodes 34, 50, 70.

The second signal internal electrode 24 is not opposed to the first, third, and fourth ground internal electrodes 30, 50, 70 in the laminating direction of the insulator layers 9. This results in producing no substantial capacitance component between the second signal internal electrode 24 and the first, third, and fourth ground internal electrodes 30, 50, 70.

The third signal internal electrode 40 is not opposed to the first, second, and fourth ground internal electrodes 30, 34, 70 in the laminating direction of the insulator layers 9. This results in producing no substantial capacitance component between the third signal internal electrode 40 and the first, second, and fourth ground internal electrodes 30, 34, 70.

The fourth signal internal electrode 60 is not opposed to the first to third ground internal electrodes 30, 34, 50 in the laminating direction of the insulator layers 9. This results in producing no substantial capacitance component between the fourth signal internal electrode 60 and the first to third ground internal electrodes 30, 34, 50.

In the fourth embodiment, the feedthrough multilayer capacitor C4 is provided with an internal electrode group including the first signal internal electrodes 20 and the first ground internal electrodes 30, another internal electrode group including the second signal internal electrodes 24 and the second ground internal electrodes 34, another internal electrode group including the third signal internal electrodes 40 and the third ground internal electrodes 50, and still another internal electrode group including the fourth signal internal electrodes 60 and the fourth ground internal electrodes 70. The first signal internal electrode 20, the second signal internal electrode 24, the third signal internal electrode 40, and the fourth signal internal electrode 60 are electrically connected to each other through the first to third signal connection conductors 14a-14c. The first ground internal electrode 30, the second ground internal electrode 34, the third ground internal electrode 50, and the fourth ground internal electrode 70 are electrically connected to each other through the first to third ground connection conductors 15a-15. The above-described four internal electrode groups are juxtaposed in the opposed direction of the first and second end faces 4, 5 in the capacitor element body 1.

As described above, the fourth embodiment also successfully realizes a circuit in which the following capacitors are connected in parallel: a capacitor with a capacitance component made by the opposed regions of the main electrode portions 21 of the first signal internal electrodes 20 and the main electrode portions 31 of the first ground internal electrodes 30; a capacitor with a capacitance component made by the opposed regions of the main electrode portions 25 of the second signal internal electrodes 24 and the main electrode portions 35 of the second ground internal electrodes 34; a capacitance with a capacitance component made by the opposed regions of the main electrode portions 41 of the third signal internal electrodes 40 and the main electrode portions 51 of the third ground internal electrodes 50; a capacitor with a capacitance component made by the opposed regions of the main electrode portions 61 of the fourth signal internal electrodes 60 and the main electrode portions 71 of the fourth ground internal electrodes 70.

The feedthrough multilayer capacitor C4 of the fourth embodiment is applicable to a noise removing circuit, as shown in FIG. 19. As shown in FIG. 19, the first signal terminal electrode 10 is connected to a power-supply circuit 90, and the first signal connection conductor 14a, the second signal connection conductor 14b, the third signal connection conductor 14c, the fourth signal connection conductor 14d, and the second signal terminal electrode 11 are connected to respective different IC circuits 91-95. The first ground terminal electrode 12, the second ground terminal electrode 13, the first ground connection conductor 15a, the second ground connection conductor 15b, the third ground connection conductor 15c, and the fourth ground connection conductor 15d are connected to the ground (GND). In the noise removing circuit shown in FIG. 19, the single feedthrough multilayer capacitor C4 is able to remove noise from the plurality of IC circuits 91-95 (five circuits in the present embodiment).

The above described the preferred embodiments of the present invention, but it is noted that the present invention is not always limited to the above-described embodiments but can be modified in various ways without departing from the scope of the invention.

The number of the laminated insulator layers 9 and the number of the laminated layers of the internal electrodes 20, 24, 30, 34, 40, 50, 60, 70 in the capacitor element body 1 are not limited to the numbers described in the above-described embodiments and modification examples. The number of internal electrode groups is not limited to the numbers described in the above-described embodiments, either.

The shapes of the respective internal electrodes 20, 24, 30, 34, 40, 50, 60, 70 are not limited to those described in the above embodiments and modification examples. In the second to fourth embodiments, therefore, each internal electrode 20, 24, 30, 34, 40, 50, 60, 70 may be of a meander shape, and the areas may be different among the opposed regions of the main electrode portions 21, 25, 41, 61 of the signal internal electrodes 20, 24, 40, 60 and the main electrode portions 31, 35, 51, 71 of the ground internal electrodes 30, 34, 50, 70.

In the second embodiment the first signal internal electrode 20, the second signal internal electrode 24, and the third signal internal electrode 40 are electrically connected to each other through the first and second signal connection conductors 14a, 14b, but they may be electrically connected to each other through a single signal connection conductor. The first ground internal electrode 30, the second ground internal electrode 34, and third ground internal electrode 50 are electrically connected to each other through the first and second ground connection conductors 15a, 15b, but they may be electrically connected through a single ground connection conductor.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A structure for mounting a feedthrough multilayer capacitor,
the feedthrough multilayer capacitor comprising:
a capacitor element body with a dielectric property;
first and second signal internal electrodes and first and second ground internal electrodes arranged in the capacitor element body; and first and second signal terminal electrodes, first and second ground terminal electrodes, a signal connection conductor, and a ground connection conductor arranged on an exterior of the capacitor element body;

wherein the first signal internal electrode is connected to the first signal terminal electrode and the signal connection conductor;

wherein the second signal internal electrode is connected to the second signal terminal electrode and the signal connection conductor;

wherein the first ground internal electrode is connected to the first ground terminal electrode and the ground connection conductor;

wherein the second ground internal electrode is connected to the second ground terminal electrode and the ground connection conductor;

wherein the first signal internal electrode and the first ground internal electrode have respective regions opposed to each other so as to sandwich at least a portion of the capacitor element body;

wherein the second signal internal electrode and the second ground internal electrode have respective regions opposed to each other so as to sandwich at least a portion of the capacitor element body;

wherein the first signal internal electrode and the second ground internal electrode are not opposed to each other, and a capacitance component is not substantially formed between the first signal internal electrode and the second ground internal electrode;

wherein the second signal internal electrode and the first ground internal electrode are not opposed to each other, and a capacitance component is not substantially formed between the second signal internal electrode and the first ground internal electrode;

wherein the first and second signal terminal electrodes are connected to a signal line, the first and second ground terminal electrodes are connected to a ground line, and the signal connection conductor and the ground connection conductor are not connected to the signal line and are not connected to the ground line; and wherein the first signal terminal electrode is connected to a first portion of a signal line, the second signal terminal is connected to a second portion of the signal line, and the first portion of the signal line is electrically connected to the second portion of the signal line only through the first and second signal terminal electrodes, the first and second signal internal electrodes, and the signal connection conductor.

2. The feedthrough multilayer capacitor according to claim 1, wherein the first signal internal electrode and the second ground internal electrode are located in an identical layer, and wherein the second signal internal electrode and the first ground internal electrode are located in an identical layer.

3. The feedthrough multilayer capacitor according to claim 1, wherein the first and second signal internal electrodes and the first and second ground internal electrodes are of a meander shape.

4. The feedthrough multilayer capacitor according to claim 1, wherein an area of the opposed regions of the first signal internal electrode and the first ground internal electrode is different from an area of the opposed regions of the second signal internal electrode and the second ground internal electrode.

5. The feedthrough multilayer capacitor according to claim 1, wherein the capacitor element body has first and second principal faces of a rectangular shape facing each other, first and second end faces extending in a transverse direction of the first and second principal faces so as to connect the first an second principal faces, and first and second side faces extending in a longitudinal direction of the first and second principal faces so as to connect the first and second principal faces;

wherein the first and second signal terminal electrodes and the ground connection conductor are disposed on the first side face; and wherein the first and second ground terminal electrodes and the signal connection conductor are disposed on the second side face.

6. The feedthrough multilayer capacitor according to claim 1, wherein the first signal internal electrode has a main electrode portion including the region opposed to the first ground internal electrode, and lead portions extending from the main electrode portion and connected to the first signal terminal electrode and to the signal connection conductor, respectively;

wherein the second signal internal electrode has a main electrode portion including the region opposed to the second ground internal electrode, and lead portions extending from the main electrode portion and connected to the second signal terminal electrode and to the signal connection conductor, respectively;

wherein the first ground internal electrode has a main electrode portion including the region opposed to the first signal internal electrode, and lead portions extending from the main electrode portion and connected to the first ground terminal electrode and to the ground connection conductor, respectively; and wherein the second ground internal electrode has a main electrode portion including the region opposed to the second signal internal electrode, and lead portions extending from the main electrode portion and connected to the second ground terminal electrode and to the ground connection conductor, respectively.

7. A structure for mounting a feedthrough multilayer capacitor, the feedthrough multilayer capacitor comprising:

a capacitor element body with a dielectric property;

a plurality of internal electrode groups each of which comprises a signal internal electrode and a ground internal electrode arranged in the capacitor element body so as to have respective regions opposed to sandwich at least a portion of the capacitor element body;

first and second signal terminal electrodes and first and second ground terminal electrodes arranged on an exterior of the capacitor element body; and at least one signal connection conductor and at least one ground connection conductor arranged on the exterior of the capacitor element body;

wherein the signal internal electrodes in the respective internal electrode groups are electrically connected to each other through said at least one signal connection conductor;

wherein the ground internal electrodes in the respective internal electrode groups are electrically connected to each other through said at least one ground connection conductor;

wherein one signal internal electrode among the signal internal electrodes in the respective internal electrode groups is connected to the first signal terminal electrode, and any one signal internal electrode other than said one signal internal electrode among the signal internal electrodes in the respective internal electrode groups is connected to the second signal terminal electrode;

wherein one ground internal electrode among the ground internal electrodes in the respective internal electrode groups is connected to the first ground terminal electrode, and any one ground internal electrode other than said one ground internal electrode among the ground internal electrodes in the respective internal electrode groups is connected to the second ground terminal electrode;

wherein the signal internal electrode and the ground internal electrode in respective different internal electrode groups among the plurality of internal electrode groups are not opposed to each other, and a capacitance component is not substantially formed between the signal internal electrode and the ground internal electrode in the respective different internal electrode groups;

wherein the first and second signal terminal electrodes are connected to a signal line, the first and second ground terminal electrodes are connected to a ground line, and said at least one signal connection conductor and said at least one ground connection conductor are not connected to the signal line and are not connected to the ground line; and wherein the first signal terminal electrode is connected to a first portion of a signal line, the second signal terminal is connected to a second portion of the signal line, and the first portion of the signal line is electrically connected to the second portion of the signal line only through the first and second signal terminal electrodes, the first and second signal internal electrodes, and the signal connection conductor.

* * * * *